(12) United States Patent
Bowden et al.

(10) Patent No.: US 10,852,903 B2
(45) Date of Patent: Dec. 1, 2020

(54) OPTIMIZING TRANSPORTATION NETWORKS THROUGH DYNAMIC USER INTERFACES

(71) Applicant: Lyft, Inc., San Francisco, CA (US)

(72) Inventors: Harrison Joel Bowden, Oakland, CA (US); Zachary Alistair Cole, San Francisco, CA (US); Maxamilion Ab Gustofson, Burlingame, CA (US); Jonathan Aaron Tourtellot, San Francisco, CA (US); Patrick Steven Wong, San Francisco, CA (US); Frank Taehyun Yoo, San Carlos, CA (US)

(73) Assignee: LYFT, INC., San Francisco, CA (US)

(*) Notice: Subject to any disclaimer, the term of this patent is extended or adjusted under 35 U.S.C. 154(b) by 0 days.

(21) Appl. No.: 16/525,339

(22) Filed: Jul. 29, 2019

(65) Prior Publication Data

US 2020/0097131 A1 Mar. 26, 2020

Related U.S. Application Data

(63) Continuation of application No. 15/859,299, filed on Dec. 29, 2017, now Pat. No. 10,365,783.

(51) Int. Cl.
*G06F 3/00* (2006.01)
*G06F 3/0481* (2013.01)
(Continued)

(52) U.S. Cl.
CPC ......... *G06F 3/0481* (2013.01); *G01C 21/343* (2013.01); *G01C 21/3438* (2013.01);
(Continued)

(58) Field of Classification Search
CPC . G06F 3/0481; G01C 21/343; G01C 21/3438; G01C 21/36
See application file for complete search history.

(56) References Cited

U.S. PATENT DOCUMENTS 9,009,177 B2 4/2015 Zheng et al.
9,104,293 B1 8/2015 Kornfeld et al.
(Continued)

FOREIGN PATENT DOCUMENTS

KR 10-2015-0085153 A 7/2015
KR 10-1617595 B1 5/2016
(Continued)

OTHER PUBLICATIONS

Ma, Shuo et al., "T-Share: A Large-Scale Dynamic Taxi Ridesharing Service", 2013, IEEE, pp. 410-421: Conference T-Share A Large-Scale Dynamic Taxi Ridesharing Service.pdf.
(Continued)

*Primary Examiner* — Nicholas Augustine
(74) *Attorney, Agent, or Firm* — Keller Jolley Preece

(57) ABSTRACT

The present disclosure relates to providing a dynamic graphical user interface for efficiently presenting users with relevant ride information throughout the fulfilment of a ride request. In some embodiments, the system detects a trigger event during a ride, and based on detecting the trigger event, the system expands or collapses an information portion within a graphical user interface. When in a collapsed state, for example, the information portion of the graphical user interfaces includes a first set of content. Upon detecting a trigger event, the system dynamically expands the information portion to provide a second set of content that includes information associated with the detected trigger.

20 Claims, 13 Drawing Sheets

(51) Int. Cl.
  *G06F 3/0484* (2013.01)
  *G06F 3/0482* (2013.01)
  *G01C 21/34* (2006.01)
  *G01C 21/36* (2006.01)
  *G06F 3/01* (2006.01)
  *G06Q 50/30* (2012.01)

(52) U.S. Cl.
  CPC ....... *G01C 21/367* (2013.01); *G01C 21/3664* (2013.01); *G06F 3/0482* (2013.01); *G06F 3/04842* (2013.01); *G06Q 50/30* (2013.01)

(56) References Cited

U.S. PATENT DOCUMENTS

| | | | |
|---|---|---|---|
| 9,146,125 B2 | 9/2015 | Vulcano et al. | |
| 9,813,510 B1 | 11/2017 | Nickels et al. | |
| 9,959,512 B2 | 5/2018 | Camp et al. | |
| 10,365,783 B2 | 7/2019 | Bowden et al. | |
| 2006/0080386 A1 | 4/2006 | Roykkee et al. | |
| 2006/0200384 A1* | 9/2006 | Arutunian | G06Q 30/0273 705/14.69 |
| 2008/0133579 A1* | 6/2008 | Lim | G06F 16/9537 |
| 2011/0238690 A1* | 9/2011 | Arrasvuori | G06F 16/00 707/769 |
| 2013/0132887 A1 | 5/2013 | Amin et al. | |
| 2013/0339891 A1* | 12/2013 | Blumenberg | G01C 21/3694 715/771 |
| 2014/0040079 A1 | 2/2014 | Smirin | |
| 2014/0129951 A1 | 5/2014 | Amin et al. | |
| 2015/0187100 A1* | 7/2015 | Berry | G06Q 30/00 345/634 |
| 2015/0206267 A1 | 7/2015 | Khanna et al. | |
| 2016/0239502 A1 | 8/2016 | Alonso et al. | |
| 2016/0308798 A1* | 10/2016 | Magistrado | H04L 51/046 |
| 2016/0364812 A1 | 12/2016 | Cao | |
| 2017/0046024 A1* | 2/2017 | Dascola | G06F 3/04845 |
| 2018/0053423 A1 | 2/2018 | DaCosta et al. | |
| 2018/0088749 A1* | 3/2018 | Yamashita | G06F 9/451 |

FOREIGN PATENT DOCUMENTS

WO  WO 2009-002603 A1  12/2008
WO  WO 2019/133526  7/2019

OTHER PUBLICATIONS

International Search Report & Written Opinion as received in PCT/US2018/067284 dated Apr. 29, 2019.
U.S. Appl. No. 15/859,299, dated May 18, 2018, Office Action.
U.S. Appl. No. 15/859,299, dated Dec. 26, 2018, Office Action.
U.S. Appl. No. 15/859,299, dated May 16, 2019, Notice of Allowance.

* cited by examiner

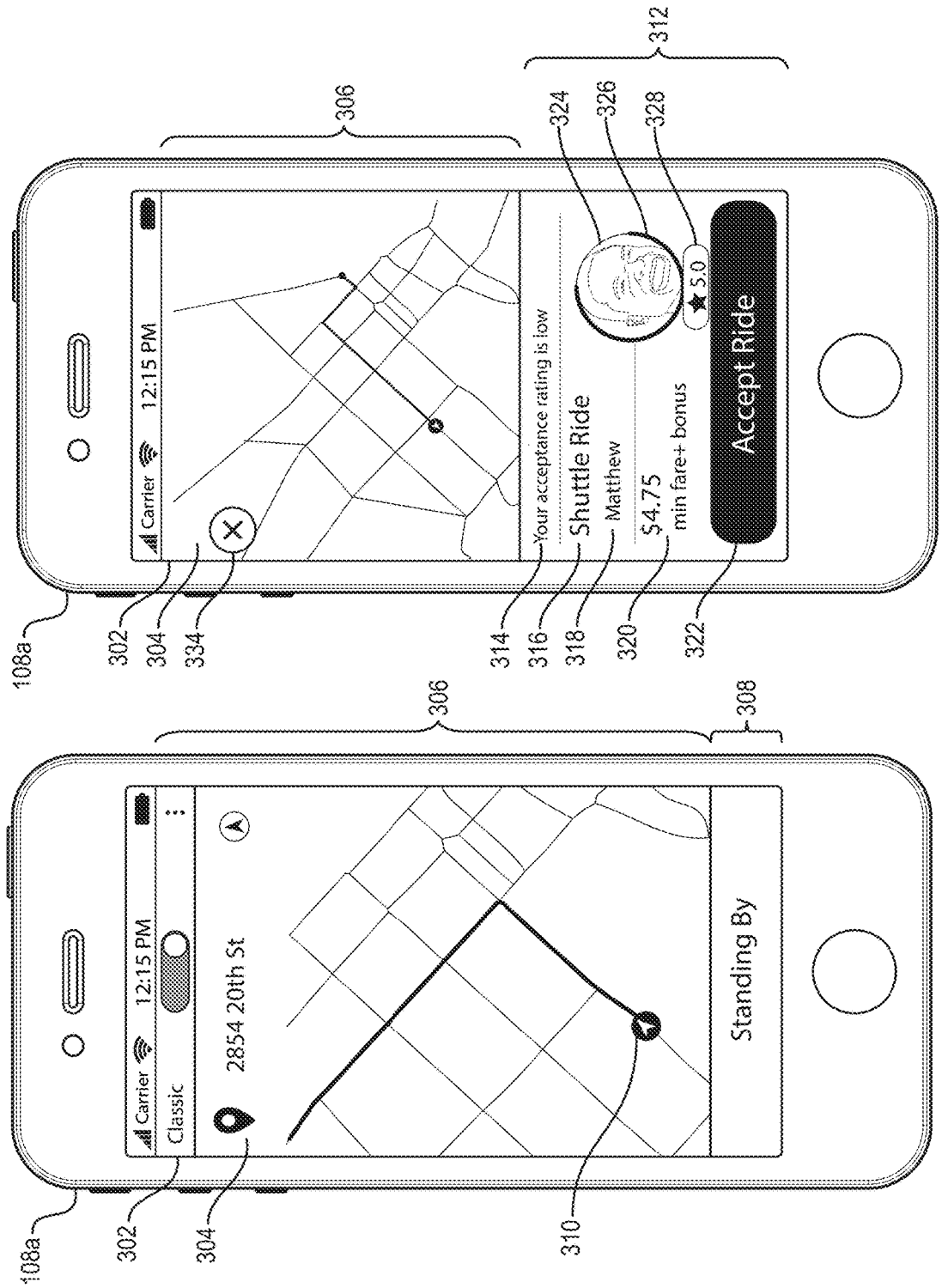

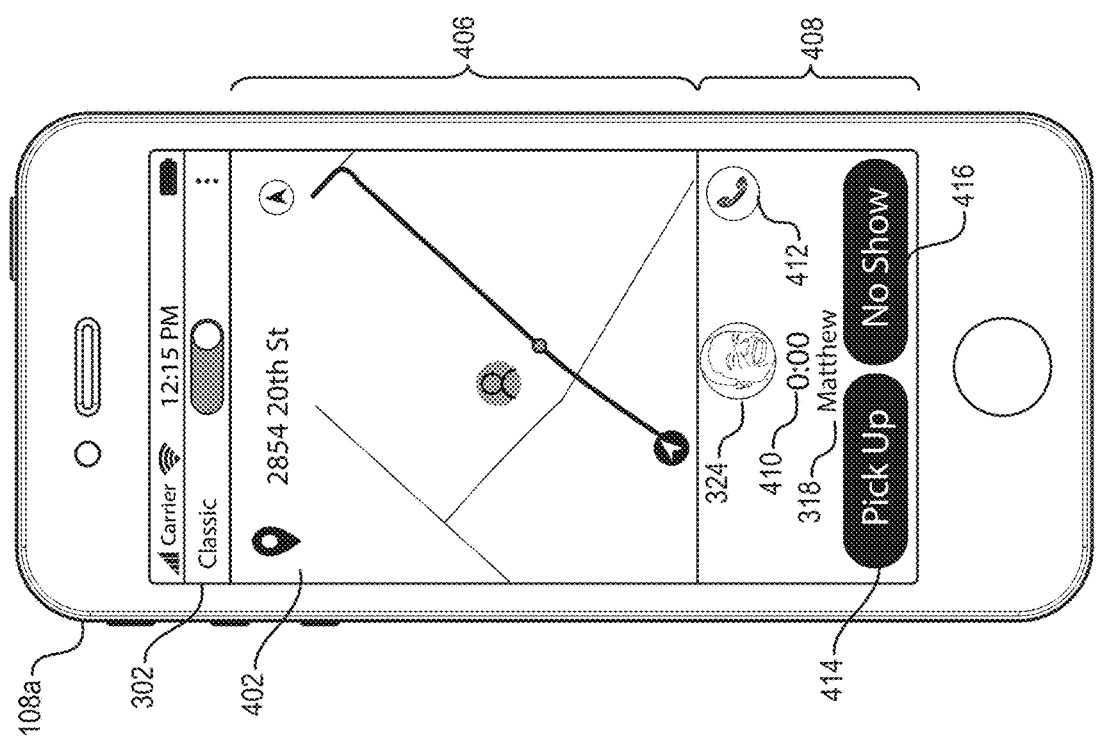

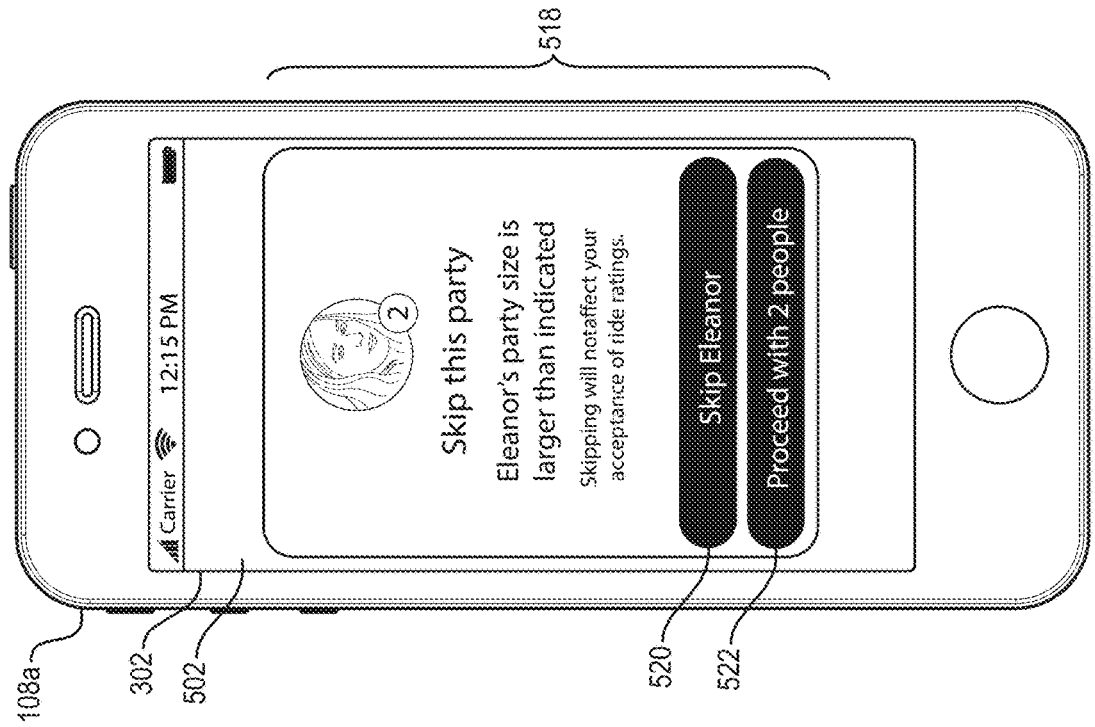
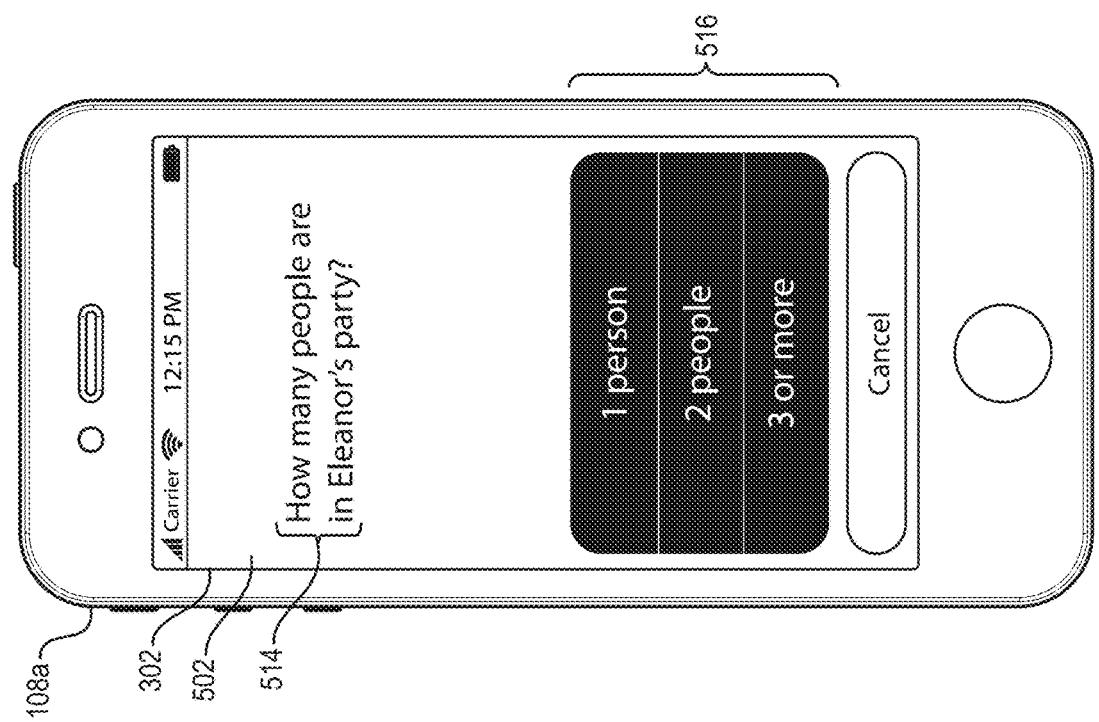
Fig. 5D
Fig. 5C

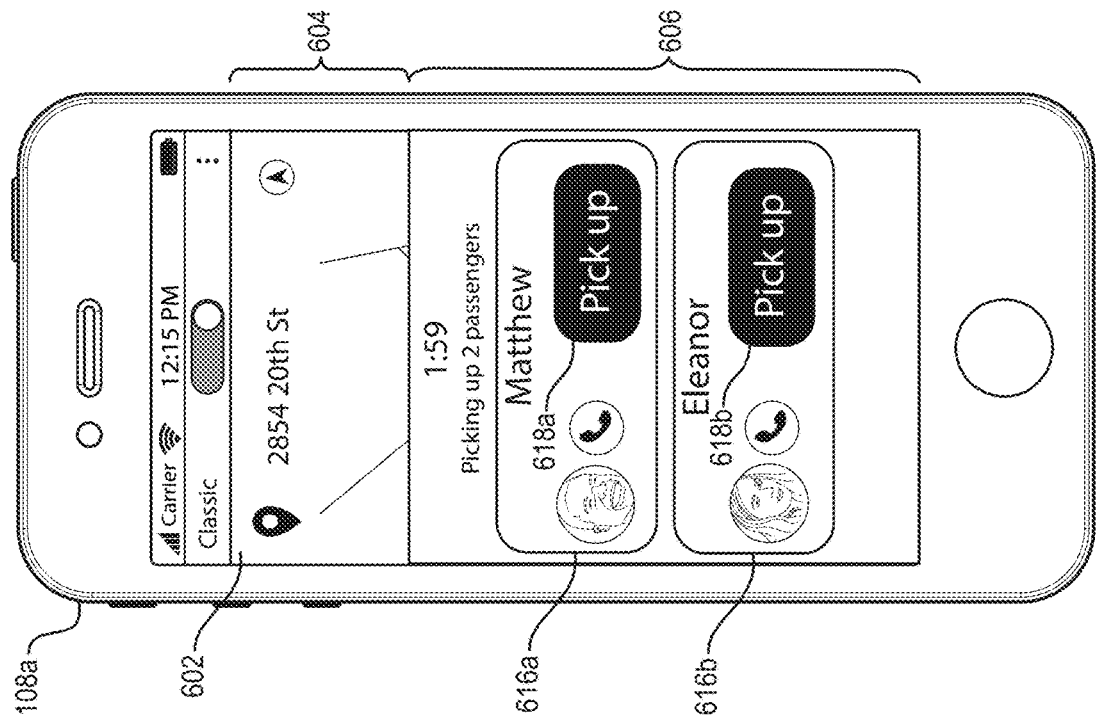
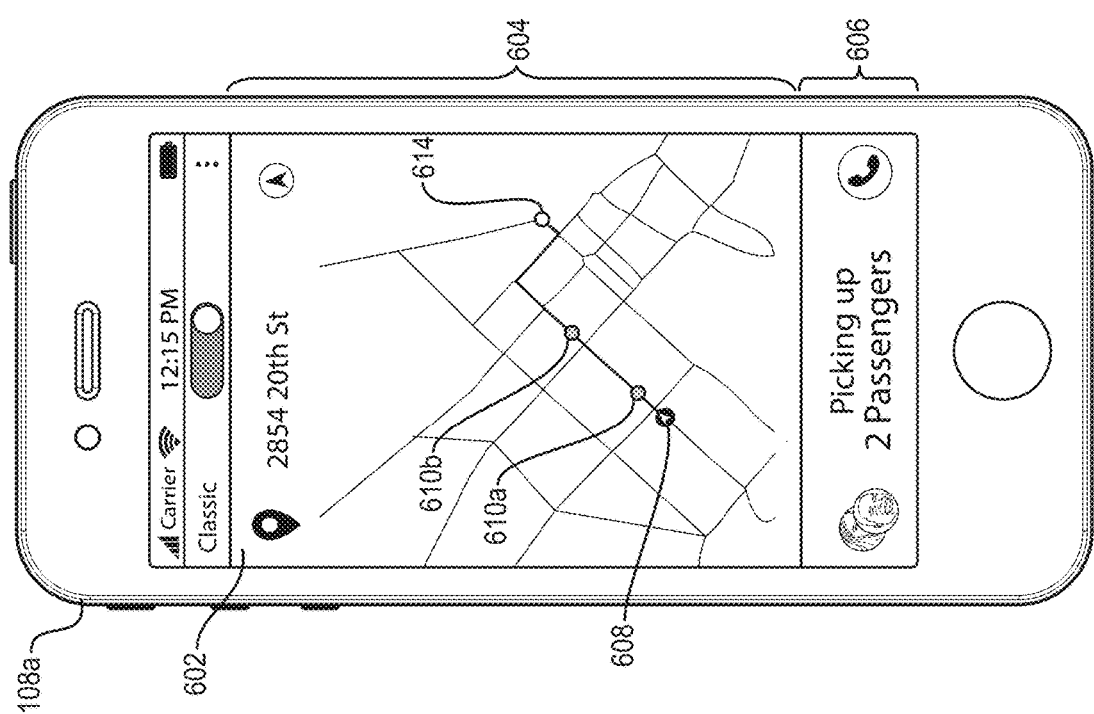

OPTIMIZING TRANSPORTATION NETWORKS THROUGH DYNAMIC USER INTERFACES

CROSS-REFERENCE TO RELATED APPLICATIONS

The present application is a continuation of U.S. application Ser. No. 15/859,299, filed on Dec. 29, 2017. The aforementioned application is hereby incorporated by reference in its entirety.

BACKGROUND

Advances in electronic technologies have enabled users of computing devices (e.g., computers, tablets, smart phones) to find, connect, and request rides from other users in a transportation network. For example, modern technologies facilitate transportation services by receiving a ride request from a rider and assigning a driver to the facilitate the ride. To facilitate user interaction with digital content related to a ride, a driver, or other rider information, conventional transportation systems often provide graphical user interfaces as part of receiving and matching a ride request from a rider with a driver. These conventional systems, however, have several disadvantages and drawbacks.

One disadvantage, for example, is that conventional transportation systems often provide a static graphical user interface (e.g., via a mobile computing device) that does not provide a driver with relevant information about a rider or ride request. For instance, many conventional transportation systems primarily display a map that includes a route and directions from the driver location to a pickup location of a rider. However, at various points of between accepting a ride request and completing a ride, a driver often needs to access information relevant to the ride request or rider. With conventional systems, a driver must manually navigate away from the map to locate such information, which typically requires the driver to locate and access a series of buttons within a graphical user interface.

Not only do graphical user interfaces of conventional transportation systems result in a potential safety issue (e.g., a driver attempting to manually access information while driving), such conventional graphical user interfaces also result in a relatively time-consuming process for a driver to access relevant ride information (e.g., rider rating, rider contact information, or number of riders). In many cases, a driver needs to access ride information to accept and complete a ride request. For example, a driver can want to verify a rider rating prior to accepting a ride request, or a driver can need to call a rider to coordinate the pickup of the rider. Due to the inefficiencies of accessing ride information within conventional systems, the overall efficiency of conventional transportation systems suffers. Indeed, a delay in accessing ride information can result in a delay in completing a ride request, and when considering the large number of ride requests, the combined effect of each delay can result in significant inefficiencies throughout a transportation network.

Another disadvantage of conventional transportation systems is that they do not effectively provide communication between drivers and riders, which often leads to unnecessarily cancelled rides. For example, in many conventional systems, if a driver does not readily see a rider upon arriving at a designated pickup location, the driver can often abandon the ride request without picking up the rider. In these situations, however, the rider can still want a ride and can be relatively close to the pickup location. Nevertheless, due to the communication friction between driver and rider of conventional transportation systems, the driver can abandon the ride request rather than hassle with trying to communicate with the rider. The abandonment of a ride request results in a host of inefficiencies within conventional transportation systems, e.g., assigning the abandoning driver a new ride request (often having a different pickup location), receiving a second ride request from the abandoned rider, processing the second ride request, and assigning a new driver to pick up the rider.

Furthermore, technical limitations in conventional transportation systems often introduce additional inefficiencies in situations where the actual number of riders differs from the number of riders reported in the ride request. For example, a ride request sent to a driver can indicate a single rider. However, when the driver arrives at the pickup location, the driver can learn that, in fact, there are two or more riders. In order to correct this mistake, the driver or rider must cancel the current ride request and send a new ride request with the correct number of riders. In this situation, the driver has lost time driving to the pickup location, and the rider has lost time waiting for the original driver. Moreover, additional computational resources within the transportation network are required to receive a new ride request, assign the driver another route, and assign a new driver to the new ride request. Accordingly, conventional transportation systems often result in inefficient management of resources in which the actual number of riders differs from the number of riders reported in the ride request.

Thus, there are several disadvantages with regard to the conventional transportation systems.

SUMMARY

One or more embodiments described herein provide benefits and/or solve one or more of the foregoing or other problems in the art with systems, methods, and computer readable storage media that provides a dynamic graphical user interface for efficiently presenting providers (e.g., drivers) with relevant ride information throughout the servicing of a ride request. In some embodiments, the system detects a trigger event during a ride, and based on detecting the trigger event, the systems expand or collapse an information portion within a graphical user interface. When in a collapsed state, for example, the information portion of the graphical user interfaces includes a first set of content to allow for other graphical elements to occupy a larger area of the graphical user interface (e.g., a map and routing directions). On the other hand, upon detecting a trigger (e.g., a driver client device arriving at a pickup location for a ride request), the system dynamically expands the information portion to provide a second set of content that includes information associated with the detected trigger (e.g., information relevant arriving at a pickup location).

Additional features and advantages of the present disclosure will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

Various embodiments will be described and explained with additional specificity and detail through the use of the accompanying drawings in which:

FIG. 3A-3C illustrate a graphical user interface in accordance with one embodiment disclosed herein;

FIGS. 4A-4C illustrate another graphical user interface that allows a user to activate a function in accordance with one embodiment disclosed herein;

FIGS. 5A-5D illustrate another graphical user interface that allows a user to activate a function in accordance with one embodiment disclosed herein;

FIGS. 6A-6D illustrate another graphical user interface that allows a user to activate a function in accordance with one embodiment disclosed herein;

DETAILED DESCRIPTION

Figure 1:
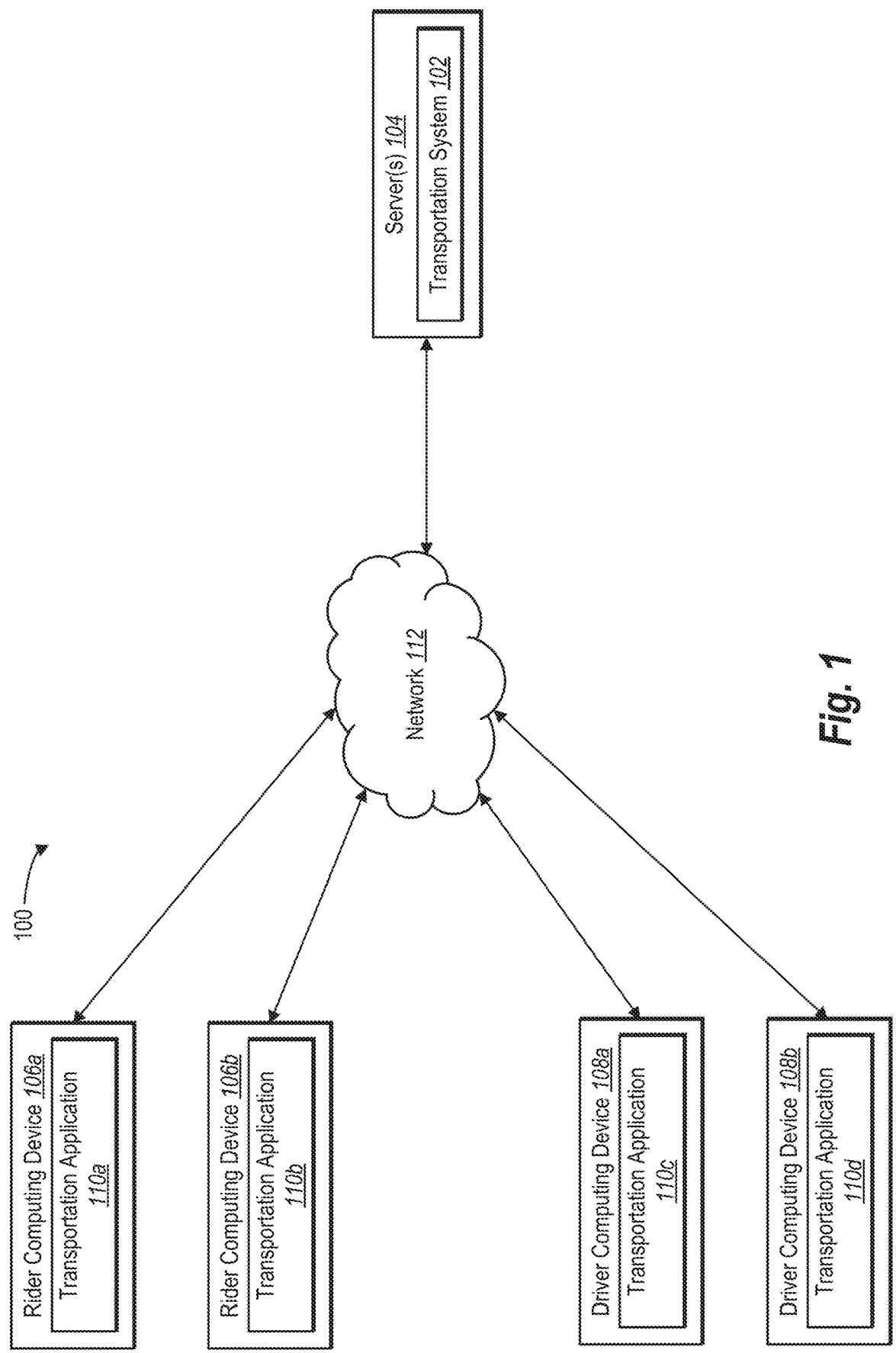
FIG. 1 illustrates an environmental diagram of the transportation system in accordance with one or more embodiments.

One or more embodiments of the present disclosure include a transportation system that allows a user to easily access information within a graphical user interface displayed on a client device associated with a provider (e.g., a driver). For example, the transportation system can provide a graphical user interface (or "user interface") for display on a provider's computing device (e.g., a driver's computing device) that dynamically presents information and/or options associated with a ride request at a time in which that information and/or options are relevant during the servicing of the ride request. In some embodiments, the transportation system detects a trigger event during a ride, and based on detecting the trigger event, the transportation system expands or collapses an information portion within a graphical user interface. When in a collapsed state, for example, the information portion includes a first set of content to allow for other graphical elements (e.g., a map and routing directions) to occupy a larger area of the graphical user interface. On the other hand, upon detecting a trigger event (e.g., approaching a pickup location), the transportation system dynamically expands the information portion to provide a second set of content that includes information associated with the detected trigger (e.g., an option to call a rider upon arriving at a pickup location).

As mentioned, in at least one embodiment, the information portion expands and collapses in response to trigger events. The information portion in the collapsed state can display limited information or a discrete subset of information relevant to the progression of servicing a ride request. For example, when the information portion is in the collapsed state, an interactive map portion occupies an initial area of a user interface, or a larger portion of the computing device's screen. For example, when a provider is in route to pick up a requestor, the most relevant information to the provider is the map and directions. Accordingly, when in the collapsed state the information portion includes relevant information related to the ride request (e.g., trip progress, ETA, requestor avatar), while at the same time reserving the majority of the user interface for a map and direction portion.

At other times during the fulfillment of a ride request, other ride request information becomes more relevant. For example, at various times within the progression of receiving and servicing a ride request, a provider can desire to know more specific information about the requestor or ride request. For example, upon being assigned a ride request, picking up a requestor, dropping off a requestor, or at other moments, specific information about the ride request is more relevant (e.g., requestor name, requestor rating, contact information, etc.). Thus, based upon detecting a trigger event that indicates one of these times, the graphical user interface dynamically updates (e.g., without user interaction) to expand the information portion to provide additional information or content related to the ride request.

In addition to providing additional information in the expanded state, the information portion can also provide additional selectable options based on detecting a particular trigger event. For instance, in response to detecting a ride request, the expanded information portion can display a provider-selectable button to perform an action and/or provide information to the transportation network. The options within the expanded information portion coincide with the detected trigger event so that the user interface provides the most relevant options for a segment within the progression of fulfilling the ride request. In some embodiments, once the provider selects an option, the content within the expanded information portion can change to provide additional options or information, or alternatively, the information portion can collapse to its collapsed state, as briefly discussed above.

In one or more embodiments, the transportation system can cause the client device to prompt the provider to contact the requestor (e.g., via a phone call or text) when the provider's computing device enters a pickup area, the information portion can dynamically transition from a collapsed state to an expanded state that provides the provider with a selectable option to contact the requestor. For instance, upon detecting the provider device is within a defined distance of the requestor or the designated pickup location, the transportation system causes the graphical user interface to provide a selectable option within the expanded information portion that is linked to the requestor's phone number. Thus, upon arriving at a pickup location, the provider can easily and efficiently interact with the contact selectable option, which causes the provider's client device to initiate a call to the requestor's client device.

Moreover, in some examples, the transportation system can provide a user interface that prohibits a provider from selecting a "no show" button prior to first contacting the requestor. For instance, in one or more embodiments, upon entering a pickup area, the information portion expands to display a count-down timer element and an inactive "no show" button and an inactive contact requestor button. After the expiration of the time indicated on the timer element, the contact requestor button activates, and the provider can select the now active contact requestor button to attempt to call the requestor. Furthermore, after detecting that the provider interacted with the contact requestor button, the "no show" button is activated to allow for provider selection, which effectively cancels the trip. Accordingly, the transportation system provides a user interface that increases successful pickup rates by intuitively and efficiently prompting a provider to perform various steps (e.g., waiting and calling the requestor) prior to allowing the provider to cancel the ride request.

Furthermore, at least one embodiment, the information portion provides a provider the ability to indicate how many actual requestors are present if the number of actual requestors is different from the number of anticipated requestors for a ride request. For instance, when a provider's client device enters a pickup area, the information portion can expand to include a "pick up" button. Upon detecting a selection of the pickup button, the transportation system causes the user interface to provide two additional selectable options, the first option is associated with the anticipated number of requestors indicated within the ride request, and the second option is an "other" button, which the provider can select if the number of actual requestors differs from the anticipated number of requestors. If the number of requestors exceeds the number of anticipated requestors, the user interface can present a "skip requestor" button to the provider to allow a provider to cancel the ride without affecting the rating of the provider.

One or more embodiments of the transportation system help resolve shortcomings in conventional systems. For example, the transportation system provides a dynamic user interface that allows a user to quickly and easily access information that is most relevant to a particular trip segment. For example, for trip segments where accessing the map is important to the provider, the transportation system can provide ride request information in a collapsed information portion while providing a real-time map and directions in a majority of the user interface. However, for segments where the provider would naturally desire or need additional information, and when the map information is less important, the transportation management system dynamically expands the information portion to provide the options and information relevant to a particular segment of a ride. Thus, the transportation system improves on what was an unsafe process of a provider manually navigating to information by providing an automated user interface that provides relevant information to a provider at the moment the provider would desire the information.

The transportation system also increases the efficiency of the overall transportation system by decreasing the occurrence of unnecessarily cancelled rides. Unlike conventional systems that allow a provider to immediately cancel a ride, the transportation system dynamically provides a sequence of information and options that efficiently connect the provider with a requestor to increase the success rate of pickups. For instance, once the provider's computing device enters an area associated with the pickup location of a requestor, the provider cannot cancel the ride until a defined amount of time has elapsed and the provider has first selected the contact requestor button. Moreover, the dynamic user interface reduces the time for completing each ride by more efficiently connecting the provider with the requestor. Accordingly, by dynamically providing a sequence of information and options customized for a particular segment of fulfilling a ride request, the transportation system reduces the number of unnecessarily cancelled rides and the time in which ride requests are fulfilled.

These improvements lead to significant increases transportation resource efficiency as well as computation and communication resource efficiency. For instance, by reducing the time for completing a ride, and by reducing the number of cancelled rides, the amount of available transportation resources for the transportation system increases, resulting in a faster fulfillment of ride requests compared to conventional systems. Moreover, by decreasing ride request cancellations, the transportation system avoids numerous computational and communication transactions that result from a ride request cancellation (e.g., receiving a second ride request, processing the second ride request, assigning a new provider to the second ride request, assigning the cancelling provider to another ride request, etc.). Thus, the transportation system described herein directly improves the function of the transportation system's computer devices and communication resources by reducing the number of computational steps the system performs compared to conventional systems.

As used herein, the term "graphical user interface" or "user interface" means one or more instruments to facilitate interaction between a user and a computer device. For example, a user interface can provide visual, audible, selectable, or other human perception features that allow a user to interact either passively (e.g., viewing a presentation of information) or actively (e.g., selecting a graphical element. As will be described more fully herein, a graphical user interface can include visual elements, selectable elements, audible elements, and/or tactile elements (e.g., vibration) that allow a user to interact with and use the transportation system.

For ease of explanation, this disclosure describes the transportation system as providing a user interface to a user (e.g., a provider) via a client device associated with the user. It should be understood that the transportation system can refer to a system including servers, server-side applications, client devices, client applications, and one or more networks. Thus, when describing that the transportation system provides user interfaces and associated interface features, it is understood based on the disclosure herein that each of the components within the transportation system, or any combination of the components, can provide one or more portions of the user interface. In other words, in some embodiments, the term transportation system refers to the combination of servers, client devices, applications, and networks.

Turning now to the figures, FIG. 1 illustrates an example environment 100 for the transportation system 102 including requestor computing devices 106a and 106b (e.g., computing devices associated with riders) and the provider computing devices 108a and 108b (e.g., computing devices associated with drivers). As shown, in one or more embodiments, the transportation system 102 can be on one or more servers 104. As further shown in FIG. 1, the requestor computing devices 106a and 106b and the provider computing devices 108a and 108b can communicate with the transportation system 102 via a network 112.

In one or more embodiments, the network 112 can include one or more networks and can use one or more communication platforms or technologies suitable for transmitting data and/or communication signals. In one or more embodiments, the network 112 includes a cellular network. Alternatively, the network 112 can include the Internet or World Wide Web. Additionally, or alternatively, the network 112 can include various other types of networks that use various communication technologies and protocols.

As further illustrated in FIG. 1, each of the requestor computing devices 106a and 106b and the provider computing devices 108a and 108b include the transportation application 110a, 110b, 110c, and 110d. In one or more embodiments, the transportation application 110a-110d enable the users (i.e., requestors) of the requestor computing devices 106a and 106b and the users (i.e., providers) of the provider computing devices 108a and 108b to interact and communicate with the transportation system 102. For example, requestors can configure and send ride requests via the transportation applications 110a and 110b. Providers can receive ride assignments and accept and fulfill ride requests using the transportation applications 110c and 110d. In at least one embodiment, the transportation applications 110a and 110b include features specific to requestors, while the transportation applications 110c and 110d include features specific to providers.

As a general overview of the transportation system 102, one or more requestor computing devices 106a and 106b send a ride request to the transportation system 102. As discussed above, a ride request refers to information provided by the transportation applications 110a and 110b and utilized by the transportation system 102 to match and assign ride requests to provider computing devices 108a and 108b. In one or more embodiments, the transportation system 102 receives a ride request from the transportation application 110a installed on the requestor computing device 106a, and utilizes the information provided in the ride request to match the request to the provider computing device 108a. For example, the transportation system 102 matches the ride request to the provider computing device 108a based on: proximity of the provider computing device 108a to a specified pickup location, provider ratings and preferences, and/or the specified destination location.

After matching the ride request from the requestor computing device 106a to the provider computing device 108a, the transportation system 102 requests confirmation from the matched provider computing device 108a. For example, the transportation system 102 provides information to and receives confirmations from the provider computing devices 108a via the transportation application 110c. In response to receiving a confirmation from the provider computing device 108a, the transportation system 102 provides a communication via the transportation application 110a on the requestor computing device 106a stating that a provider associated with provider computing device 108a will fulfill the ride request.

In at least one embodiment, ride requests from two or more requestor computing devices 106 can be matched with a single provider computing device 108. For example, the transportation system 102 can match a first ride request from the requestor computing device 106a with the provider computing device 108a. The transportation system 102 receives a second ride request from requestor computing devices 106b. The transportation system 102 provides information regarding the ride request to the provider computing device 108a. Based on various factors, the transportation system can determine to combine the first ride request with the second ride request to create a shared ride that will be fulfilled by the provider corresponding to provider computing device 108a.

As mentioned above, during the fulfilment of a ride request, the transportation system 102 provides a dynamic user interface to the provider computing device 108a. For instance, the transportation system tracks the progress of the ride, detects trigger events associated with segments of the ride, and dynamically provides information and options within the user interface that are relevant and customized to a particular ride segment. For instance, and as will be explained further below, provider computing device 108a can continually determine a GPS location of the provider computing device. The transportation system 102 can compare the GPS location of the provider computing device to a pickup location associated with a ride request. Upon detecting that the GPS location is within a defined distance from the pickup location, the transportation system can change an information portion from a collapsed state to an expanded state to present information and/or options associated with picking up a requestor at the pickup location.

Figure 2:
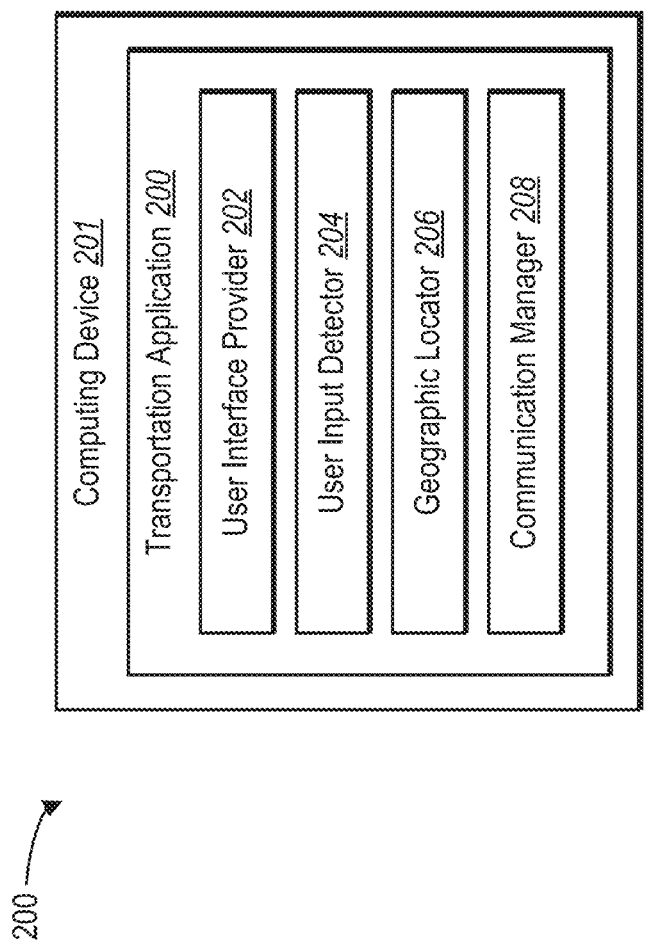
FIG. 2 illustrates a schematic diagram of a transportation management system in accordance with one or more embodiments disclosed herein.

FIG. 2 illustrates an example embodiment of a transportation application 200 (or simply "application 200"). As shown, application 200 can include, but is not limited to, user interface provider 202, user input detector 204, geographic locator 206, and communication manager 208. Each of the components 202-208 can be in communication with one another using any suitable communication technologies. It will be recognized that although components 202-208 are shown separate in FIG. 2, any of components 202-208 can be combined into fewer components, such as into a single component, or divided into more components as can serve a particular embodiment. In addition, components 202-208 can be located on, or implemented by, one or more computing devices, for example, a handheld device, tablet, laptop computer, or desktop computer, or other computing devices. In addition, one or more portions of application 200 can be located on one or more servers 104, such as described above in reference to FIG. 1.

Each of components 202-208 can comprise software, hardware, or both. For example, each of components 202-208 can comprise one or more instructions stored on a computer-readable storage medium and one or more processors of one or more computing devices to execute the instructions. When executed by the one or more processors, the computer-executable instructions cause a computing device to perform the methods described herein. Alternatively, components 202-208 can comprise hardware, such as a special purpose processing device to perform a certain function or group of functions.

As mentioned above, and as shown in FIG. 2, application 200 can include user interface provider 202. User interface provider 202 can provide a user interface that allows a user to navigate, browse, view, share, manage, and/or otherwise experience digital content using application 200. For example, user interface provider 202 can provide a user interface that facilitates a presentation of digital content on a computing device. In addition, and as mentioned above, user interface provider 202 can provide a user interface that allows a user to easily and quickly view and activate one or more functions from within the user interface. For example, user interface provider 202 can provide a user interface that allows a provider to contact a provider via the transportation applications 110 from within the user interface.

More specifically, user interface provider 202 can provide (e.g., by way of a display screen associated with a computing device) a variety of graphical elements within the user interface. For example, user interface provider 202 can cause a computing device to present one or more graphical elements that represent digital content. For instance, in one or more embodiments, user interface provider 202 can present a digital representation of a map that indicates the location of the provider's computing device based on data received from the geographic locator 206 discussed below. In some embodiments, user interface provider 202 can also present information regarding the trip (e.g., fare charge, requestor rating, time until pickup). Interface provider 202 receives trip information from the transportation system 102. Alternatively, user interface provider 202 can facilitate presentation of other types of digital content (e.g., audio, videos), depending on the particular embodiment of application 200.

In addition to providing a variety of graphical elements, user interface provider 202 can further provide one or more interactive elements related to functions within the transportation system. For instance, interface provider 202 can display interactive elements that activate a function on the computing device. A function can include activating hardware, executing software, accessing content, sending a communication, or a combination thereof. For example, user interface provider 102 can provide a contact button that, when selected by the user, initiates a communication between the user's computing device and the computing device of another user.

As further illustrated in FIG. 2, application 200 can include user input detector 204. In one or more embodiments, user input detector 204 can detect, identify, and/or receive, a user interaction and translate a user interaction into a user input (e.g., a user command or request). As referred to herein, a "user interaction" means a single interaction, or combination of interactions, received from a user by way of one or more input devices. In some embodiments, user input detector 204 can translate a combination of user interactions as a single user input and/or translate a single user interaction into multiple user inputs.

For example, user input detector 204 can detect a user interaction from a touch screen, or any other input device. In the event a touch screen is used as an input device, user input detector 204 can detect one or more touch gestures (e.g., swipe gestures, tap gestures, pinch gestures, or reverse pinch gestures) that a user provides to the touch screen. In one or more embodiments, the user can provide one or more touch gestures in relation to and/or directed at one or more graphical elements or interactive elements of a user interface. User input detector 204 can additionally, or alternatively, receive data representative of a user interaction.

Application 200 can utilize user input and/or signals or commands associated from user input, to manage, control, and/or facilitate the use of the transportation system 102. In general, in response to user input detector 204 detecting one or more user interactions, application 200 allows a user to view, search, edit, share, and/or otherwise interact with information associated with using the transportation system. For example, in response to user input detector 204 detecting one or more touch gestures, application 200 allows a user to accept a ride request, view requestor information, activate directions, contact a requestor, as well as additional operations or actions.

FIG. 2 further illustrates that application 200 can include geographic locator 206. Geographic locator 206 can detect the geographic location of a computing device (e.g., provider computing device 108a. The geographic locator 206 can transmit geographic location data to transportation system 102. Transportation system 102 can use geographic location data to match providers with ride requests, assign ride requests to providers, and track the progress of a ride with respect to a pickup location, a ride route, and a drop off location.

Geographic locator 206 can also interact with user interface provider 202 to present real-time trip data. Specifically, geographic locator 206 sends geographic location data to user interface provider 202. User interface provider 202 can use the data to generate a map that corresponds with the geographic location of the computing device. Furthermore, interface provider 202 can update the data presented on the screen of a computing device based on the geographic location data received from the geographic locator 206.

FIG. 2 further illustrates that application 200 can include communication manager 208. Communication manager 208 can facilitate receiving and sending data to and from application 200. For example, communication manager 208 can package or format digital content to be sent or to process digital content received by application 200 in any necessary form that is able to be sent through one or more communication channels and using an appropriate communication protocol.

The transportation application 200 can utilize one or more of the components 202 to 208 detect a trigger event. As used herein, a "trigger event" is a computer determinable condition. For example, a trigger event can correspond to determining that a specified condition is satisfied. In some embodiments discussed herein, a trigger event can include detecting a location of a computing device, detecting a ride status, detecting a location of a computing device with respect to another location (e.g., a pickup location or drop off location), detecting a speed of computing device (e.g., a speed of a device within a moving car), detecting receipt of data or information (e.g., ride request information), detecting user input, and/or other events or occurrences associated with fulfilment of a ride request. Other examples of trigger events can include information that can be determined by a location, (e.g., a distance to a pickup location, a distance to a drop off location, an ETA from a location, etc.). Also trigger events could also include an expiration of an amount of time, a lateness/delay for a predicted ETA, or other determination based on a time limit or a time related event. Additional examples of trigger events can include events related to supply and demand of rides, such as provider incentives, numbers of requestors in a region, number of providers in a region, or other supply and demand information. As will be described in greater detail below, based upon detecting a trigger event, the transportation system can dynamically update and provide information corresponding to a particular trigger event within a user interface.

Figure 3C:
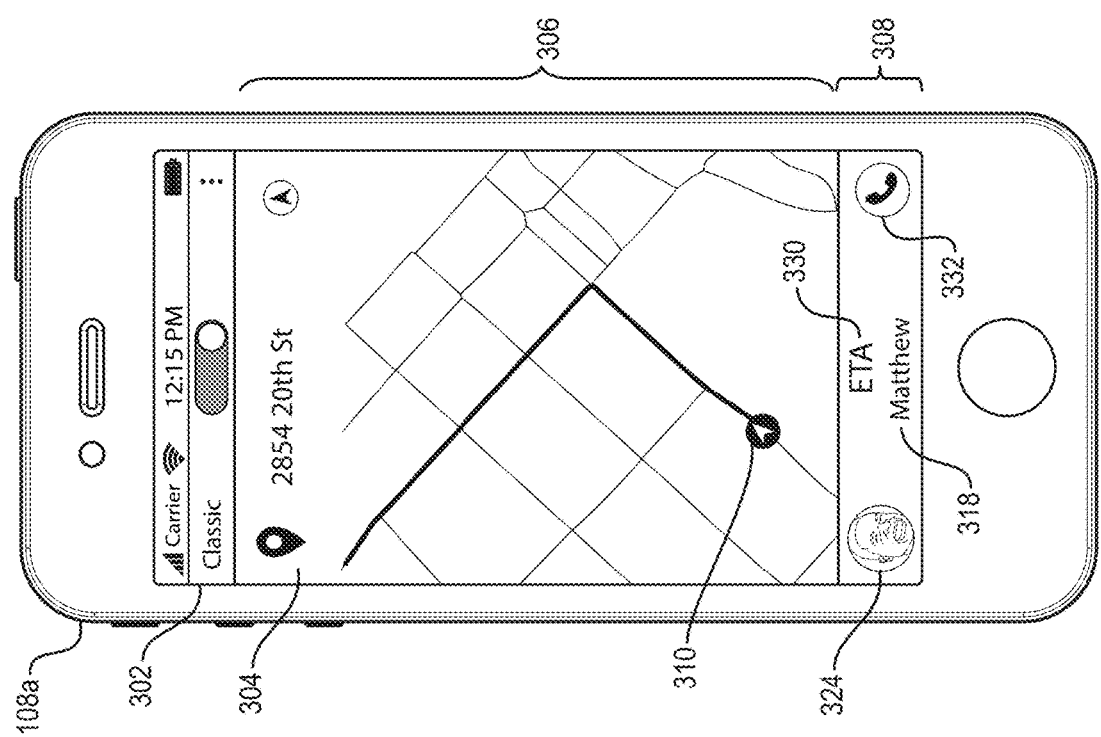

FIGS. 3A-6D illustrate a series of graphical user interfaces (GUIs) by which the transportation system 102 provides various display elements, information, options, and other features to a provider computing device. For example, FIGS. 3A-3C illustrate an example process by which a provider of a provider computing device 108a can accept a ride request from the transportation system 102. Specifically, as illustrated in FIGS. 3A-3C, the transportation system 102 provides a GUI 304 on a touch screen display 302 of the provider computing device 108a that can be dynamically updated with information and options to allow a provider to assess and accept or reject a ride request matched to the provider computing device 108a.

As illustrated in FIG. 3A, the GUI 304 can include map portion 306 with a device-based location indicator 310. As shown, the transportation system 102 positions the device-based location indicator 310 on a position within the map portion 306 based on GPS information received from the geographic locator 206 on provider computing device 108a. As the position of the computing device 108a changes, the transportation system 102 updates the position of the device-based location indicator 310 on the map portion 306.

As further illustrated in FIG. 3A, the GUI 304 includes a collapsed information portion 308 that includes information regarding the status of the provider within the transportation system 102. For example, when the transportation system 102 identifies that the provider computing device 108a is not associated with a current ride request, the transportation system 102 can provide, in the collapsed information portion 308, that the provider computing device 108a is "standing by." The amount of the display 302 that the collapsed information portion 308 consumes may vary from one embodiment to the next. For instance, and as shown in FIG. 3A, the collapsed information portion 308 can use about one-eighth of the display 302. In alternative embodiments, the collapsed information portion 308 can use more or less display area than as illustrated FIG. 3A, while the area of the collapsed information portion 308 should be sized to accommodate GUI area for a primary function since the information in the collapsed information portion 308 is secondary to the primary function. In addition, the amount of display 302 area the collapsed information portion 308 uses may depend on the specific trigger event detected and/or the type or amount of information corresponding to a trigger event.

While in the GUI 304 is in the standing-by mode illustrated in FIG. 3A, the transportation system 102 can identify potential ride requests that can be matched with the provider computing device 108a. Once the transportation system 102 matches a ride request from the requestor computing device 106a to the provider computing device 108a, the transportation system 102 sends a ride request data to the provider computing device 108a. The receipt of the ride request data is a trigger event that causes the collapsed information portion 308 to expand to an expanded information portion 312, as illustrated in FIG. 3B. For instance, upon the computing device 108a detecting the receipt of the ride request data, the computing device 108a causes the collapsed information portion 308 to dynamically change (e.g., via an animated graphical sequence) to the expanded information portion 312.

As illustrated in FIG. 3B, the expanded information portion 312 provides a larger graphical area in which additional information about the ride request is presented. For instance, the expanded information portion 312 contains information that a provider can use to decide whether or not to accept the ride request. For example, the expanded information portion 312 can include a ride type element 316, requestor name element 318, the estimated fare charge element 320, requestor avatar element 324, requestor rating element 328, acceptance timer element 326, interactive "accept ride" element 322, or any combination of the above.

As indicated, the expanded information portion 312 can provide requestor information, such as the requestor name element 318, requestor avatar element 324, and requestor rating element 328. The provider will use this information to decide whether or not to accept the ride request. Before accepting a ride request, many providers desire to know the requestor rating. Accordingly, the expanded information portion provides the requestor rating element 328 within the expanded information portion 312 to allow a provider to quickly access requestor information upon receiving the ride request.

Similarly, prior to accepting a ride request, providers typically want to know about characteristics of the ride. Thus, in some embodiments, the transportation system provides the ride type element 316 and the estimated fare charge element 328 within the expanded information portion 312. For instance, the ride type element 316 can indicate whether the ride is a shared ride or a single ride. Moreover, the estimated fare charge element 328 can include information regarding the financial benefit the provider can expect upon acceptance and fulfilment of the ride request. In some cases, the fare charge element 328 can include inventive information, such as a bonus as indicated in FIG. 3B.

Furthermore, the expanded information portion 312 can include provider status alert 314 that indicates the provider's acceptance rating. For instance, a provider's rating and/or compensation can partially depend upon the provider's willingness to accept ride requests. Thus, the transportation system 102 can provide provider status alert 314 to indicate a provider's acceptance rating, thus increasing the likelihood that the provider will accept the request, which will increase the efficiency of the transportation system.

In some embodiments, the expanded information portion 312 includes a timer feature that limits the amount of time a provider can accept a ride request. As illustrated in FIG. 3B, the acceptance timer element 326 indicates the amount of time until the ride request expires. For example, when the provider computing device 108a receives a ride request, the acceptance timer element 326 begins to run or otherwise countdown. In addition, the expiration of the time indicated in the timer element 326 can serve as a trigger event to allow the transportation system 102 to dynamically update the GUI 304. For instance, upon the time associated with the timer element 326 expiring, the expanded information portion 312 can dynamically transition again to the collapsed state shown in FIG. 3A.

As shown in FIG. 3B, the timer element 326 can take the form of a disappearing bold perimeter around the requestor avatar element 324. Thus, as the time approaches expiration, the bold portion of the perimeter becomes smaller and smaller. If the provider does not accept the ride prior to the expiration of the time, the transportation system 102 cancels the ride request and assigns it to another provider. Accordingly, the acceptance timer element 326 can prompt a provider to quickly accept a ride request, which leads to a faster completion of the ride and a more efficient transportation system.

In one or more embodiments, the GUI 304 includes a reject ride element 334, as indicated in FIG. 3B. For instance, while the transportation system 102 can automatically cancel the ride request upon expiration of a time period, a provider can also affirmatively reject a ride request by interacting with the reject ride element 334. By providing an option to allow a provider to affirmatively reject a ride request, the transportation system can gain additional efficiencies in the event the provider rejects the ride request prior to the expiration of a time period. For instance, the reject ride element 334 allows a provider to cancel a ride request immediately, freeing the provider up to be assigned a different ride, and freeing the declined ride request to be assigned to another provider. In some embodiments, upon the provider interacting with the reject ride element 334, the GUI 304 transitions to a standby mode as illustrated in FIG. 3A.

As mentioned above, the expanded information portion 312 can include an accept ride element 322. The accept ride element 322 is an interactive element with which the provider can interact (e.g., by providing a touch gesture) to accept the ride. Thus, the expanded information portion 312 not only includes all relevant information regarding a ride request, but the expanded information portion further includes a selectable option to allow a provider to react to the information and accept or reject a ride request. Moreover, transportation system dynamically provides the expanded information portion 312 upon detecting the trigger event of receiving a ride request. Accordingly, prior to detecting the ride request trigger event, the GUI 304 can include other elements that are more relevant to the provider prior to receiving a ride request (e.g., the location of the provider).

Additionally, in response to matching a ride request with the provider computing device 108a, the transportation system 102 can provide a map portion 306 showing a proposed route from the present location of the provider computing device 108a to the proposed pickup location corresponding to the ride request. The ride configuration GUI 304 displays the proposed route and map information in the interactive map portion 306 of the provider computing device 108a to further provide information relevant to the provider's decision to accept the ride request.

Upon detecting provider interaction with the "accept ride" button 322, the transportation system 102 registers an accepted ride request, which can be set as a trigger event. In response, to detecting the trigger event of the provider accepting the ride request, the transportation system 102 can collapse the expanded information portion 312 to return to the collapsed information portion 308, shown in FIG. 3C. By doing so, the transportation system again dynamically updates the GUI 304 to include a larger map portion 306 to facilitate providing the provider with visually clear directions while in route to the pickup location associated with the accepted ride request.

In addition to displaying a larger map portion 306, the transportation system 102 can provide abbreviated information regarding the ride within the collapsed information portion 308, as illustrated in FIG. 3C. For example, the collapsed information portion 308 can include information such as the estimated time of arrival at the pickup location 330, a requestor avatar element 324, a requestor name element 318, and a contact element 332. Accordingly, the transportation system 102 dynamically updates the GUI 304 to provide the provider the most relevant information associated with a segment of a ride. In the case of FIG. 3C, the most relevant information after accepting a ride request is the route and directions to the pickup location, and therefore, the map portion 306 fills the majority of the GUI 304, while the information portion collapses to only show a minimal amount of information associated with the ride (as opposed to the detailed information shown prior to the provider accepting, e.g., FIG. 3B).

As illustrated in FIG. 3C, in some embodiments the collapsed information display 308 can include an interactive contact element 332 with which the provider can interact to contact the requestor. Once the transportation system 102 detects that the provider has interacted with (e.g., tapped) the contact element 332, the transportation can facilitate communication between the provider computing device 108a and the requestor computing device 106a. In one or more embodiments, the transportation system detects a trigger event, such as the speed of the provider computing device 108a, to determine to activate or activate the contact element 332. For instance, the transportation system can activate the contact element upon detecting the provider computing device is not moving, while on the other hand, the transportation system can deactivate the contact element upon detecting the provider computing device is moving or is moving above a threshold speed.

In some embodiments, the transportation system 102 can continue to provide the GUI 304 illustrated in FIG. 3C while updating the map portion 306 with the provider computing device 108a location and providing the directions corresponding to the accepted ride request. This presentation can continue until the transportation system detects another trigger event. In at least one embodiment, the transportation system 102 provides the GUI 304 until the transportation system 102 detects that provider computing device 108a enters a pickup location area designated by the ride request. As used herein, "pickup location area" means a geographic area associated with a pickup location of a requestor. For example, the pickup location area includes a specified area around the location that the requestor, through the transportation application 110a on the requestor computing device 106a, designates as the desired pickup location. For example, the requestor associated with requestor computing device 106a can input the requestor's current location as the pickup location. The transportation system 102 can designate the requestor's current location in addition to a specified amount of area around the location as the pickup location area. The transportation system 102 can also create a geo-fence along the perimeter of the pickup location area.

Figure 4B:
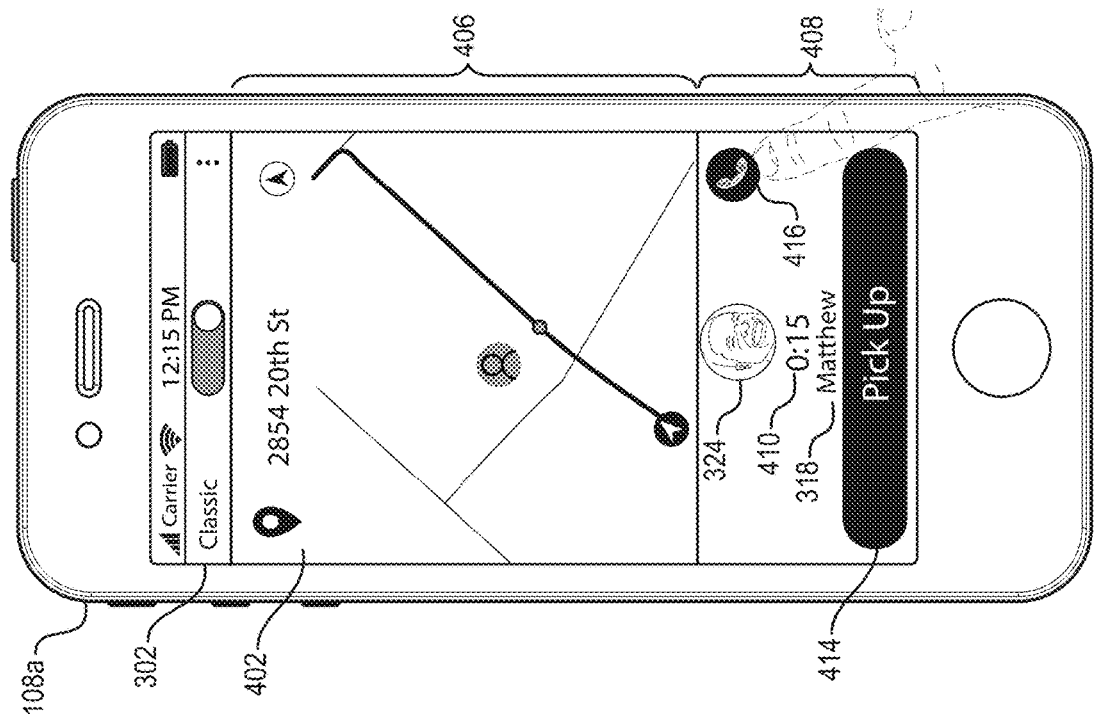
Figure 4A:
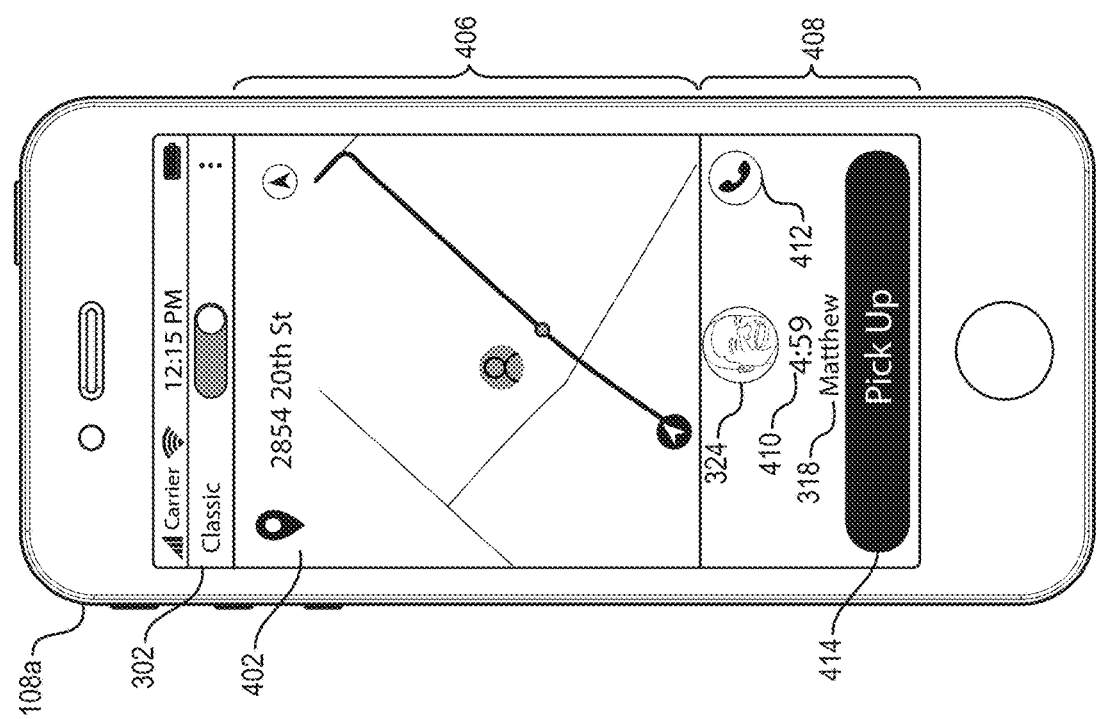

FIGS. 4A-4C illustrate a series of dynamic GUIs that the transportation system 102 provides during one or more ride segments associated with picking up a requestor. In general, FIGS. 4A-4C provide a sequence of dynamic GUI elements that the transportation system 102 dynamically presents and/or activates upon detecting various triggers associated with picking up a requestor. For instance, the transportation system detects trigger events associated with approaching a pickup location (e.g., entering a pickup location area), an elapsing of time waiting for a requestor, and a communication attempt from the provider to increase the likelihood of a successful pickup.

With reference to FIG. 3C, the GUI 304 includes the collapsed information portion 308 while the provider is in route to a pickup location associated with a requestor. The transportation system 102 detects a trigger event based on the provider computing device 108a entering a pickup location area corresponding to the pickup location. For instance, upon the provider computing device 108a approaching or arriving at the pickup location area, the transportation system determines to dynamically update the GUI 306 in response to detecting the trigger event for entering the pickup location area. Accordingly, the transportation system 102 dynamically expands the collapsed information portion 308 (shown in FIG. 3C) to the expanded information portion 408, shown in FIG. 4A.

By dynamically providing the expanded information portion 408 upon detecting the trigger event associated with arriving at a pickup location, the transportation system 102 provides a user interface that dynamically (e.g., without user input) provides relevant information and selectable options that relate to picking up a requestor. For instance, and as illustrated in FIG. 4A, the transportation system 102 provides a GUI 402 having the expanded information portion 408 that includes an avatar element 324 and requestor name element 318. The expanded information portion 408 includes requestor name element 318 and avatar element 324 to allow a provider to recognize and greet a requestor upon the requestor entering the vehicle.

In addition, and as illustrated in FIG. 4A, the expanded information portion 408 includes timer element 410. In one or more embodiments, the timer element provides a countdown for a time period within which the requestor should arrive to the vehicle upon the vehicle arriving at the pickup location. The time period may be a system defined or a user defined time period. In addition, the transportation system can determine the time period based on various factors by increasing or decreasing the time period to account for expected requestor delays or efficiencies. For instance, the time period may depend on the number of ride requests corresponding a similar pickup location within a specified period of time (e.g., if there are many requestors getting picked up in the same location, the time period may increase to allow extra time for requestors to find the correct provider). The time period can also be based on a history of pickup times for a requestor and/or history of pickup times for a location, e.g., to account for areas and users that are known to be slower or faster for a user to locate a vehicle. In addition, the time period can be based on time of day, amount of traffic, weather to determine an average amount of time that a request should take at that given time and place.

For instance, the transportation system can access and use traffic information, weather information, historical system-wide requestor data, historical individual-requestor data, provider "no show" rates, a presence of an additional ride request that may be assigned to the provider, the distance from the provider to a pickup location associated with an additional ride request that may be assigned to the provider should the requestor be a no show, and/or other data or information to determine the time period. Moreover, the requestor location, direction of movement, and/or speed can be used as a factor to determine the time period. For instance, if the requestor client device 106a indicates that the requestor is within a threshold distance from the pickup location and is moving toward the pickup location at a detected speed, then the transportation system can determine an estimated amount of time for the requestor to reach the vehicle, and use that time in determining the period of time for purposes of the timer element 410. In one or more embodiments, the system can add a time penalty (e.g., adding time) or a time reward (subtracting time) to determine a final time period.

In any event, timer element 410 displays a time value that counts down to zero and that indicates a time within which a requestor is expected to arrive at the vehicle to be picked up. In at least one embodiment, in response to detecting that provider computing device 108a enters the pickup location area, the transportation system 102 begins to countdown from the defined or determined time period. Accordingly, in at least one embodiment, the transportation system 102 provides the GUI 402 shown in FIG. 4A until either the time period expires or until the requestor arrives.

In the event that the requestor arrives at the vehicle within the time period, the provider selects the "Pick Up" element 414, which sends a notification to the transportation system 102 that the requestor is now in the vehicle and the ride is continuing to its next segment. The selection of the "Pick Up" element is a trigger event that causes the GUI to dynamically collapse the expanded information portion 408 to a collapsed information portion (e.g., the collapsed information portion 308 shown in FIG. 3C). Thus, the transportation system dynamically updates the GUI to provide the most relevant information associated with a particular segment of the ride (e.g., emphasizing the map portion and directions to clearly allow the provider to navigate the correct route after picking up the requestor).

In cases where the requestor does not arrive at the vehicle prior to the expiration of the time period, upon detecting the expiration of the time period the transportation system 102 dynamically provides a "Now Show" selectable element (see FIG. 4C) that allows a provider to cancel the ride request based on the requestor not arriving for the ride. In other words, the GUI 402 does not include an option for the provider to cancel the ride until the provider has at least waited for the time period within which the requestor should reasonably be expected to locate the provider. By withholding the option to cancel the ride request, the transportation system 102 increases its overall efficiency by systematically and intelligently influencing a provider to wait an optimal period of time prior to canceling a ride.

In addition to the timer element 410, the expanded information portion 408 can include an interactive contact element 412, as shown in FIGS. 4A-4B. In at least one embodiment, the interactive contact element 412 remains inactive, as indicated by the unfilled contact element 412 in FIG. 4A. However, after the expiration of an initial amount of time after the provider arrives at the pickup location area, the transportation system 102 can dynamically activate the contact element, as indicated by the filled contact element 416, shown in FIG. 4B. In one or more embodiments, the transportation system 102 determines the duration of the initial amount of time prior to activating the contact element 412 based on one or more of the factors described above with respect to the time period for providing a "No Show" option. In other embodiments, the initial amount of time is system defined or user defined.

In one or more embodiments, the initial time period is a sub-time-period within the overall time period before providing a "No Show" option within the GUI 402. For instance, the transportation system 102 can activate the contact element 412 upon reaching a time value during the timer element 410 countdown. FIG. 4B illustrates the GUI 402 after the timer element 410 has reached a certain time value associated with the activation of the contact element 412. Once the transportation system 102 detects that the timer element 410 value has reached the time value associated with activation of the contact element 412, the transportation system 102 presents, in the expanded information portion 408, an activated contact element 416. For example, as illustrated, the timer element 410 has reached the time value associated with activation of the contact element 412 (e.g., 0:15), and in response dynamically changes the inactive contact element 412 to the active contact element 416. For example, as illustrated in FIG. 4B, the active contact element 416 can be presented as a highlighted contact button.

In addition to activating the contact element 412 upon an expiration of an initial time period, the transportation system 102 can also detect other trigger events to activate or deactivate the contact element 412. For example, upon detecting that the location of the requestor client device 106a is beyond a threshold distance of the pickup location, the transportation system 102 can dynamically activate the contact element to allow a provider to confirm, within as short of timeframe as possible, whether the requestor still needs the ride. Other trigger events to activate the contact element 412 can include detecting the requestor is moving away from the pickup location, detecting the requestor is a defined distance away from the pickup location and has not moved within a defined period of time, and/or other events that indicate the requestor may not need or want to the ride.

In addition to activating the contact element, in one or more embodiments, the transportation system 102 can send a notification or alert to the provider that further prompts the provider to contact the requestor. For instance, the transportation system 102 can send an alert based upon determining the provider is moving in a direction away from the pickup location (e.g., indicating the provider is likely to abandon the ride), where the alert indicates the requestor's action and prompts the provider to contact the requestor to determine the requestor's intent at the earliest possible moment. Accordingly, unlike conventional systems where a provider may wait too little or too long of a time for a requestor to arrive, the transportation system 102 dynamically provides information and prompts that increase the efficiency of completing a successful pickup or determining within a reduced amount of time that the requestor is going to abandon the ride. In some cases, the transportation system 102 automatically initiates a call between the provider computing device 108a and the requestor computing device 106a. For instance, when the transportation system 102 detects the requestor moving away from the pickup location and while the provider is still driving in-route.

Returning to FIG. 4B, the provider can interact with the activated contact element 416 to initiate contact with the requestor. For instance, by selecting the contact element 416, the provider client device 108a can initiate a phone call, text, IM, or other form of electronic communication with the requestor client device 106a to allow the provider and the requestor an opportunity to communicate to complete a successful pickup of the requestor. In some embodiments, after the provider attempts to contact the requestor using the contact element 416, the transportation system 102 can deactivate the contact element so that a provider does not needlessly continue to try and contact a requestor.

FIG. 4C illustrates the GUI 402 having the expanded information portion 408 including the selectable "No Show" element 416. As discussed briefly above, the transportation system 102 can dynamically provide the no show element 416 upon the expiration of the timer period within the time element 110. For instance, and as shown in FIG. 4C, the timer element 410 indicates the timer element as 0:00, and thus, the transportation system 102 dynamically provides the no show element 416.

In at least one embodiment, the transportation system 102 does not present the no show element 416 illustrated in FIG. 4C until the transportation system 102 has detected that: 1) the provider has previously selected the interactive call element 408; and 2) that the time period represented by the timer element 410 has reached 0:00. For example, as illustrated in FIG. 4C, the timer element 410, which represents the time until presentation of the no show element, has reached 0:00. Furthermore, as illustrated in FIG. 4C, the interactive contact element 412, has already been selected, and the transport system 102 provides an inactive interactive contact element 412. Accordingly, in response to detecting that: 1) the time until presentation of the no show element has reached 0:00; and 2) the interactive contact element 412 has already been selected, the transportation system 102 presents an interactive no show element 416.

Upon detecting user selection of the interactive no show element 416, the transportation system 102 can cancel the currently pending ride request. By systematically and dynamically determining a timer period within which a requestor is expected to arrive to the vehicle, dynamically presenting the contact option, and requiring the provider to wait and attempt to contact the requestor, the transportation system 102 increases the rate of successful pickup while decreasing the amount of time to a successful pickup. Accordingly, the principles discussed above result in increases provider resource efficiencies and increased computer resource efficiencies, as explained in detail above.

FIGS. 5A-5D illustrate a process by which a provider of the provider computing device 108a indicates the number of actual requestors that attempt to enter a vehicle at a pickup location associated with a ride request. In some cases (e.g., a shared ride request), when a requestor requests a ride via the requestor computing device 106a, the requestor specifies how many people are associated with the ride request. For instance, a requestor may request a shared ride for the requestor and another friend. For a shared ride, where multiple different requestors from multiple different ride requests are combined into a single vehicle, the number of passengers is particularly important. For instance, the transportation system 102 determines to combine two ride requests into a single vehicle by determining that a vehicle has capacity to hold the number of people associated with a ride request.

Accordingly, in one or more embodiments, the transportation system provides a dynamic and efficient sequence of pickup GUIs to confirm whether the number of passengers match the indicated number of passengers specified in a ride request. For example, as shown in FIG. 5A, the transportation system 102 can detect a touch gesture performed by finger 510 (e.g., of the provider of the provider computing device 108a) with the pick-up element 508 presented on the touch screen display 302. In response to detecting the touch gesture, the transportation system 102 can present selectable options associated with the actual number of requestors. For example, in FIG. 5B, in the expanded information portion 506 includes two interactive elements associated with the number of actual requestors: an anticipated requestor confirmation element 512; and an other element 514.

Figure 5B:
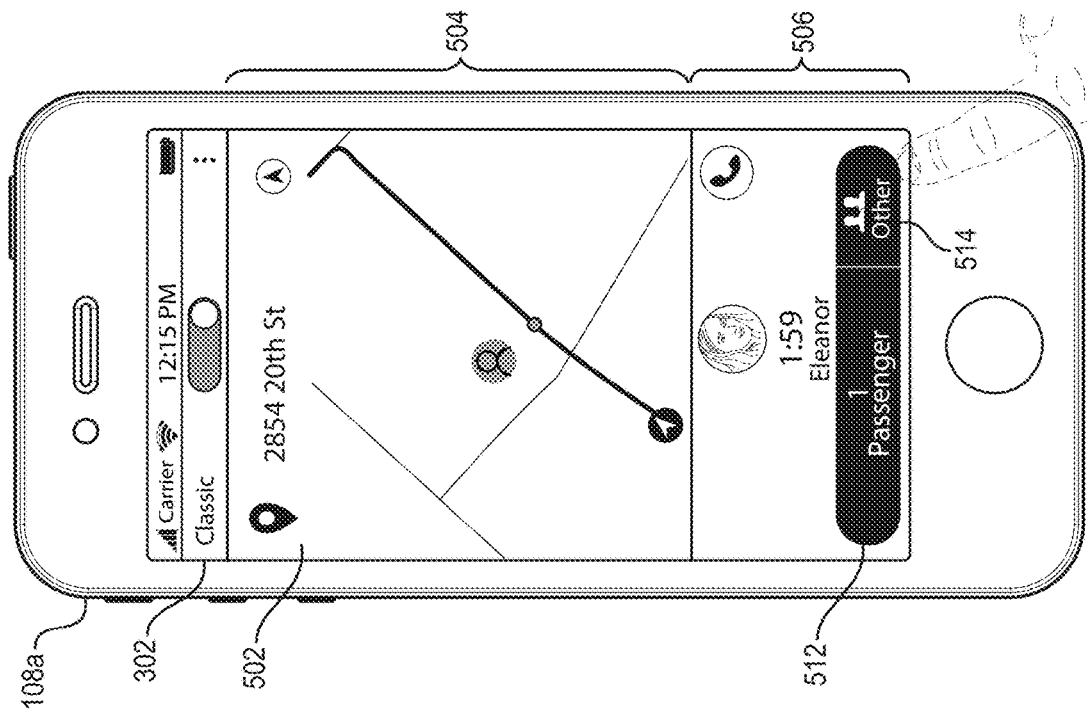
Figure 5A:
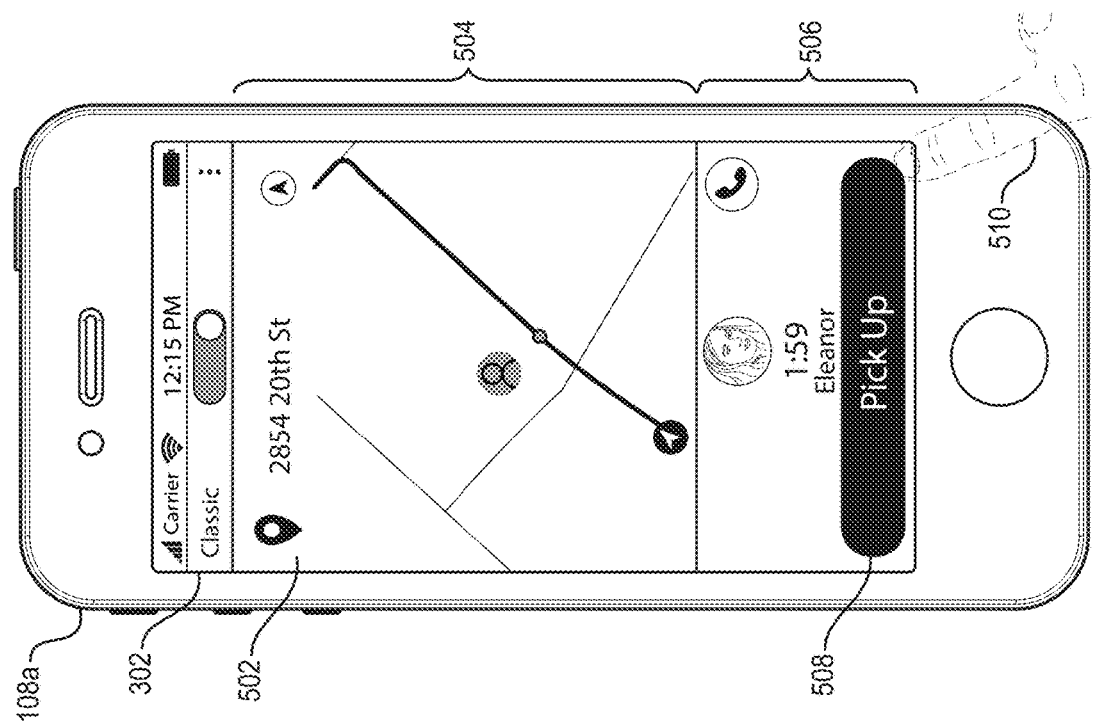

As illustrated in FIG. 5B, in at least one embodiment, the expanded information portion 506 can include an anticipated requestor confirmation element 512 associated with the number of anticipated requestors. As used herein, "anticipated requestors" means requestors that the transportation system 102 anticipates for pickup. For example, "anticipated requestors" can be the requestors reported to the transportation system 102 by the requestor through a transportation application 110a in a ride request. When the transportation system 102 detects provider interaction (e.g., a tap gesture) with the anticipated requestor confirmation element 512, the transportation system 102 can process the anticipated requestor confirmation and requestor pick up. Accordingly, the transportation system 102 provides an intuitive and efficient process for a provider to confirm that the actual number of requestors matches the anticipated number of requestors with a single user interaction.

In addition to providing an anticipated requestor confirmation element 512, the transportation system can also present the other element 514 associated with any other number of requestors beside the number of anticipated requestors. For example, as illustrated in FIG. 5B, the expanded information portion 506 can include the other element 514. The provider can select the other element 514 to indicate that the number of actual requestors differs from the number of anticipated requestors disclosed in the ride request. In response to a detected provider selection of the other element 514, the transportation system 102 can provide additional selectable options within the expanded information portion.

In one embodiment, the expanded information portion further expands to that fills the entire touch screen display 302 to accommodate the additional options, as shown in FIG. 5C. In one or more embodiments, in response to a detected selection of the other element 514, the transportation system 102 can present a user prompt element 514 and a series of selectable response elements 516 associated with different numbers of requestors. For example, as illustrated in FIG. 5C, transportation system 102 provides a user prompt element 514 (e.g., "How many people are in [the requestor]'s party?") and a series of selectable response elements 516, each associated with a different number of requestors (e.g., "1 person," "2 people," "3 or more").

The transportation system 102, upon detecting a user interaction with one of the selectable response elements 516, can provide additional options that allow a provider, and the transportation system, to effectively react to a number of requestors that is different than the anticipated number of requestors. For instance, and as shown in FIG. 5D, the transportation system 102 can update the GUI 502 to include a "skip" or cancellation option and/or a "proceed" option.

As shown in FIG. 5D, in response to detecting a user interaction indicating that the actual number of requestors is different than the anticipated number of requestors, the transportation system 102 provides the skip party notification 518. In at least one embodiment, the skip party notification 518 can include an avatar element, an explanation that the provider can opt to skip the party, an interactive skip party element 520, and a proceed element 522. Upon detection of user interaction with the interactive skip party element 520, the transportation system 102 can cancel the ride request. For instance, in the event the vehicle does not have enough capacity to accommodate the unanticipated requestors, the provider can select the skip party element 520.

In addition to the interactive skip ride element 520, as shown in FIG. 5D, the transportation system 102 can also provide a proceed element 522. In response to detecting user interaction with the proceed element 522, the transportation system 102 can confirm the pickup. Additionally, the transportation system 102 can adjust the ride request to indicate the correct number of requestors. For instance, in the event the vehicle does have the capacity to accommodate the unanticipated requestors, the provider can select the proceed element 522 which allows the ride to proceed while also sending a notification to the transportation system 102 to update the capacity in the vehicle base on the updated number of passengers in the vehicle. The transportation system 102 then uses the updated number of passengers when determining the availability of the vehicle to use in combination with other potential shared ride requests.

Figure 6D:
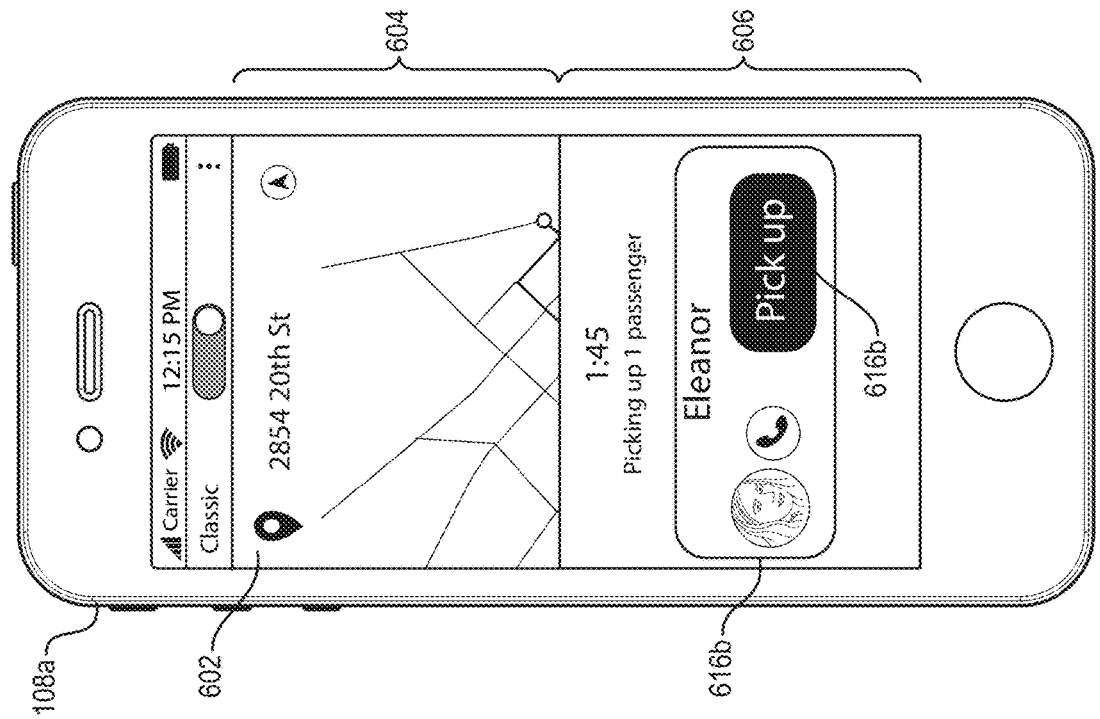

FIGS. 6A-6D illustrate a series of GUIs presented by transportation system 102 on touch screen display 302 when the transportation system has matched two or more ride requests with a single provider computing device 108a. For example, when the transportation system 102 has detected that the provider associated with provider computing device 108a accepted two separate ride requests associated with two different pickup locations, then the transportation system can present the GUI 602. As illustrated in FIG. 6A, the multiple pickup GUI 602 includes a map portion 604 and a collapsed information portion 606. Though FIGS. 6A-6D illustrate an example GUI for two pickup locations, the principles discussed with respect to FIGS. 6A-6D can apply to any number of ride requests and pickup locations.

As illustrated in FIG. 6A, the GUI 602 includes a map portion 604 with a device-based location indicator 608, pickup location indicator for a first requestor computing device 610a, pickup location indicator for a second requestor computing device 610b, and a drop off location indicator 614. The GUI 602 illustrated in FIG. 6A also includes a collapsed information portion 606. The transportation system 102 presents, in the collapsed information portion 606, information relevant to the ride request. For example, as illustrated, the collapsed information portion 606 can include avatar elements of the two or more requestors, a status report, and a contact element.

Alternatively, in at least one embodiment, the transportation system 102 can dynamically expand the collapsed information portion 606 when the transportation system 102 determines that the provider computing device 108a has entered a pickup location area associated with the first requestor computing device 106a (e.g., using the same or similar processes as discussed above with respect to FIGS. 3A-4C. For example, as illustrated in FIG. 6B, transportation system 102 expands the information portion 606 based on detecting a trigger event associated with approaching or arriving at a pickup location associated with one of the ride requests that are combined within a shared ride.

As shown in FIG. 6B, the expanded information portion 606 includes a timer element, a first notification element 616a associated with the first requestor computing device 106a, and a second notification element 616b associated with the second requestor computing device 106b. The timer element in expanded information portion 606 functions the same as or similarly to timer element 410 in FIGS. 4A-4D.

In at least one embodiment, the first notification element 616a associated with the first requestor computing device 106a can include information relevant to the first requestor computing device 106a. For example, as illustrated in FIG. 6B, the first notification element 616a can include an avatar element, a contact element, and an interactive pickup element 618a. Additionally, the transportation system 102 can present, in expanded information portion 606, additional notification elements associated with additional requestor computing devices. For example, FIG. 6B illustrates a second notification element 616b associated with the second requestor computing device 106b.

Figure 6C:
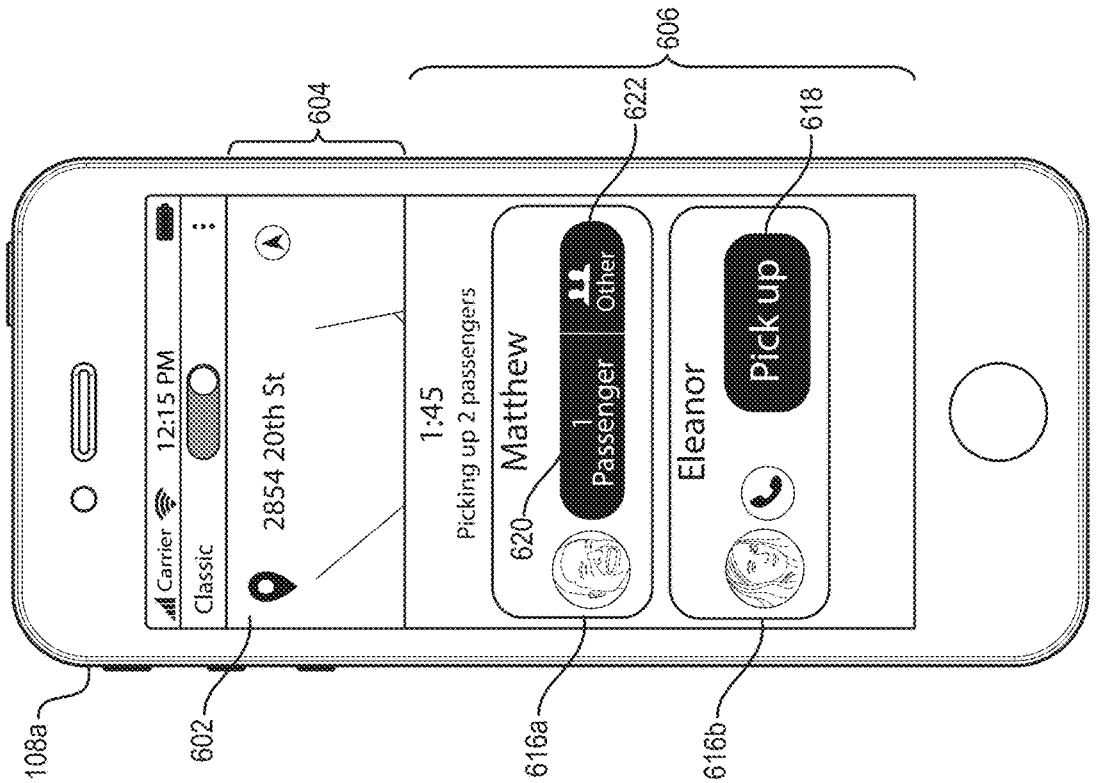

In at least one embodiment, when the transportation system 102 detects a user interaction (e.g., a tap gesture) with the pickup element located within the first notification element 616a associated with the first requestor computing device 106a, the transportation system can present selectable elements associated with the actual number of requestors at the first pickup location. As illustrated in FIG. 6C, the transportation system 102 can present, in the first notification element 616a, a selectable requestor confirmation element 620 associated with the anticipated number of requestors at the first pickup location, and a selectable other element 622. The transportation system 102 processes user interaction with these elements similarly to how the transportation system 102 processes user interaction with anticipated requestor confirmation element 512 and the other element 514, as discussed above with respect to FIG. 5B.

When the transportation system 102 detects user interaction with the requestor confirmation element 620 associated with the anticipated number of requestors at the first pickup location 620, the transportation system 102 can process the pickup confirmation for passengers associated with the first pickup location. Furthermore, the transportation system 102 can provide the GUI 602 that includes only the remaining second notification element 616b associated with the second requestor computing device 106b. For example, as illustrated in FIG. 6D, the transportation system 102 ceases to display the first notification element 616a associated with the first requestor computing device 106a upon detecting user interaction with the requestor confirmation element 620.

Figure 7:
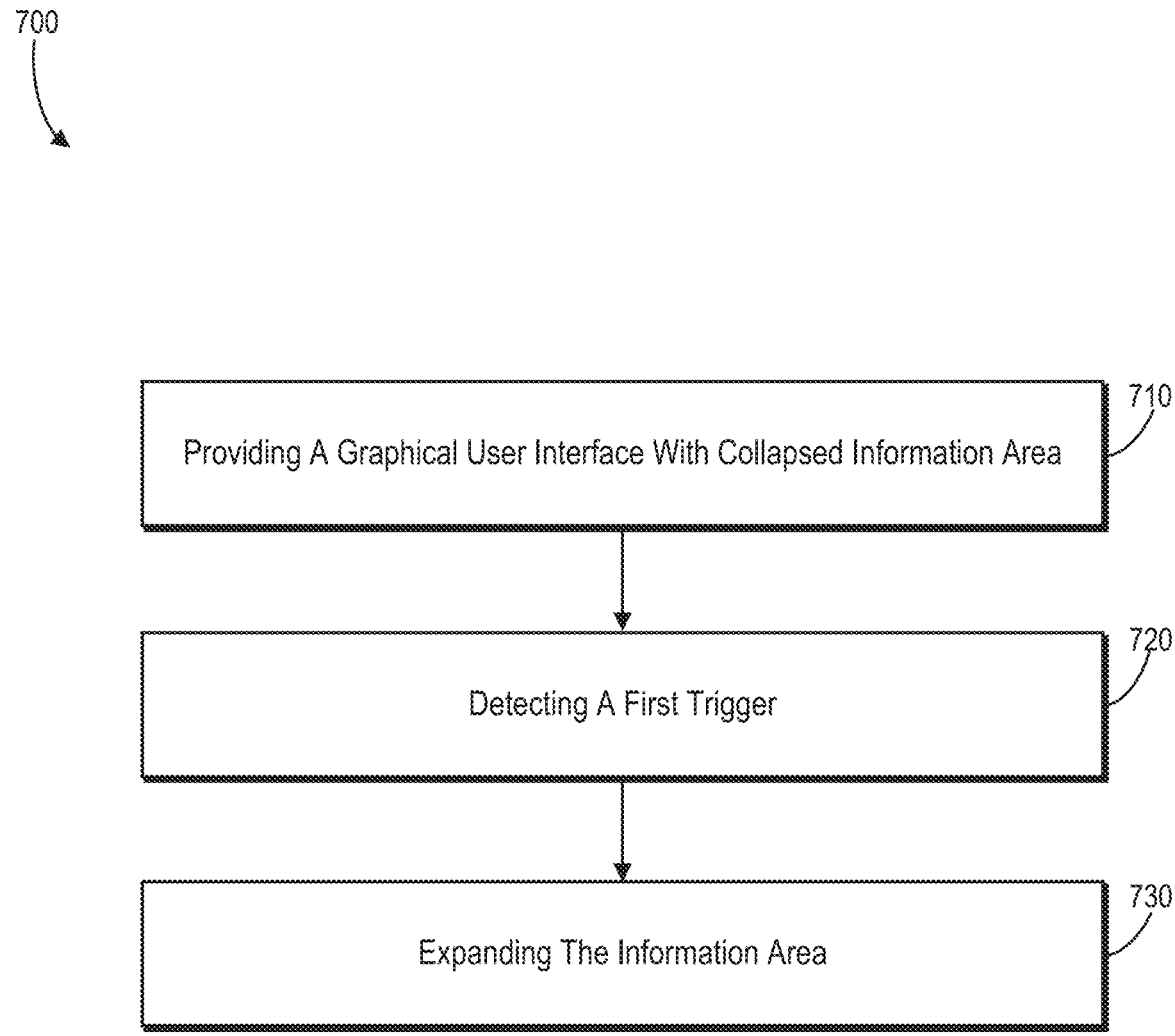
FIG. 7 illustrates a flowchart of a series of acts in a method of determining a pickup location in accordance with one or more embodiments.

Turning now to FIG. 7, this figure illustrates a flowchart of a series of acts 700 to provide a dynamic graphical user interface for use within a transportation system. While FIG. 7 illustrates acts according to one embodiment, alternative embodiments can omit, add to, reorder, and/or modify any of the acts shown in FIG. 7. The acts of FIG. 7 can be performed as part of a method. In one or more embodiments, a non-transitory computer-readable medium can comprise instructions, that when executed by one or more processors, cause a computing device to perform the acts of FIG. 7. In still further embodiments, a system can perform the acts of FIG. 7.

As shown in FIG. 7, the series of acts 700 includes an act 710 of providing a GUI with a collapsed information area. For instance, act 710 can involve providing, by a client device, a graphical user interface of a transportation system comprising a map portion that covers an initial area within the graphical user interface and an information portion in a collapsed state. For example, in at least one embodiment, after the transportation system 102 has detected user acceptance of a ride request, but before the provider reaches the pickup area location, the transportation system 102 provides a GUI with a collapsed information portion. When the information element is collapsed, a map portion can occupy the majority of the screen.

Also shown in FIG. 7, the series of acts 700 also includes an act 720 of detecting a first trigger. For instance, act 720 can involve detecting, by at least one processor, a first trigger event. For example, in at least one embodiment, the transportation system 102 can detect a trigger event associated with expanding the information element. The transportation system 102 can detect a number of triggers in act 720. Specifically, the client device receiving a ride request from another client device associated with a requestor, wherein the first trigger event comprises the device receiving a request from the other client device. In addition, act 720 can include the client device receiving a ride request from another client device associated with a requestor, wherein the first trigger event comprises the device receiving a request from the other client device.

In FIG. 7, the series of acts 700 also includes an act 730 of expanding the information area. For instance, act 730 can involve, based on the first trigger event, expanding the information portion from the collapsed state to an expanded state, wherein the map portion covers a subsequent area based on the expanded state of the information portion. For example, based on detecting the first trigger event, the transportation system 102 can expand the information element.

Method 700 can include additional acts. For instance, method 700 can further include detecting a second trigger event and based on the second trigger event, collapsing the information area to the collapsed state. For example, the transportation system 102 can, based upon a second trigger, collapse the information element. This act can include detecting the user selecting an action element displayed in the information area, wherein the second trigger comprises the user selecting the action element displayed in the information area, wherein the action element comprises one or more of an accept ride element, a contact element, a pick-up element, or a no show element.

Method 700 can include additional acts. More specifically, method 700 can include displaying, in the information area in the expanded state, digital content, wherein the digital content comprises one or more of a timer element, an inactive contact element, or a pick-up element. For example, when the provider computing device enters the pickup location area, the information element can expand to display a timer element, an inactive contact element, and an interactive pickup button.

Furthermore, method 700 can include an additional act of beginning a countdown timer associated with a specified time until a cancellation option, wherein the timer element displays a time value based on the countdown timer, and based on the time value reaching a certain time, replacing the inactive contact element with an active contact element, wherein the active contact element comprises a contact button. For example, once the transportation system 102 detects that the countdown timer has reached a certain value, then the transportation system can activate the inactive contact requestor button.

Method 700 can also include an additional act of detecting a user interaction with the active contact element and in response to the detecting the user interaction with the active contact element, contacting the other client device associated with the requestor. For example, once the transportation system 102 detects user interaction with the contact button, then the transportation system 102 can contact the requestor computing device through the transportation application located on the requestor computing device.

Method 700 can include an additional act, after the transportation system 102 has detected user interaction with the contact requestor button, including detecting that the time value associated with the countdown timer meets zero, detecting that the client device has contacted the other client device associated with the requestor, and in response to detecting that the time value associated with the countdown timer has met zero and detecting that the client device has contacted the other client device associated with the requestor, presenting a no show element, wherein the no show element comprises a no show button. For example, after the transportation system 102 has detected that the provider computing device has been in the pickup location area for a certain amount of time and detected that the user has selected the contract requestor button, the transportation system 102 can present an interactive no show button.

Method 700 can also include the following additional acts associated with indicating the number of requestors at a single pickup location. Additional acts can include: detecting a user interaction with the pick-up element, wherein the pick-up element comprises a pick up button; based on detecting the user selection of the other button, presenting a second requestor number element comprising one or more of a 1 person button, a 2 person button, or a 3 or more person button; and detecting a user interaction with the second requestor number element; and based on the user interaction with the second requestor number element, presenting a skip requestor element. For example, when the transportation system 102 detects user selection with the pickup button, the transportation system 102 can present interactive buttons associated with the number of requestors at a single pickup location. If the transportation system 102 detects user selection of an interactive element that indicates that the number of actual requestors differs from the number of anticipated requestors, the transportation system 102 can present an interactive cancel ride element.

Figure 8:
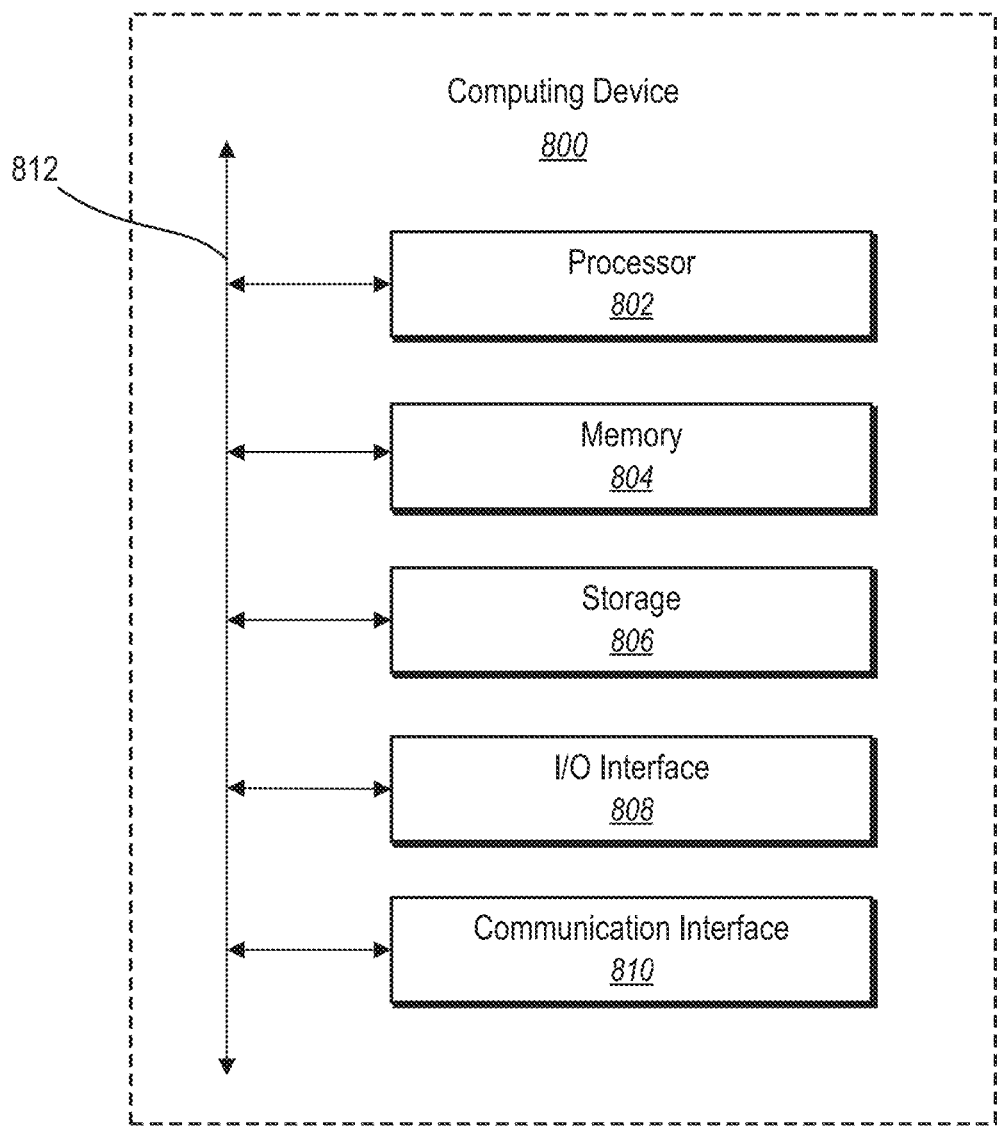
FIG. 8 illustrates a block diagram of an exemplary computing device in accordance with one or more embodiments.

FIG. 8 illustrates, in block diagram form, an exemplary computing device 800 that can be configured to perform one or more of the processes described above. One will appreciate that the transportation system 102 can comprise implementations of the computing device 800, including, but not limited to, the server(s) 104, the requestor computing devices 106*a*-106*b*, and the provider computing devices 108*a*-108*b*. As shown by FIG. 8, the computing device can comprise a processor 802, memory 804, a storage device 806, an I/O interface 808, and a communication interface 810. In certain embodiments, the computing device 800 can include fewer or more components than those shown in FIG. 8. Components of computing device 800 shown in FIG. 8 will now be described in additional detail.

For instance embodiments, processor(s) 802 includes hardware for executing instructions, such as those making up a computer program. As an example, and not by way of limitation, to execute instructions, processor(s) 802 can retrieve (or fetch) the instructions from an internal register, an internal cache, memory 804, or a storage device 806 and decode and execute them.

The computing device 800 includes memory 804, which is coupled to the processor(s) 802. The memory 804 can be used for storing data, metadata, and programs for execution by the processor(s). The memory 804 can include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 can be internal or distributed memory.

The computing device 800 includes a storage device 806 includes storage for storing data or instructions. As an example, and not by way of limitation, storage device 806 can comprise a non-transitory storage medium described above. The storage device 806 can include a hard disk drive ("HDD"), flash memory, a Universal Serial Bus ("USB") drive or a combination of these or other storage devices.

The computing device 800 also includes one or more input or output ("I/O") interface 808, which are provided to allow a user (e.g., requestor or provider) to provide input to (such as user strokes), receive output from, and otherwise transfer data to and from the computing device 800. These I/O interface 808 can include a mouse, keypad or a keyboard, a touch screen, camera, optical scanner, network interface, modem, other known I/O devices or a combination of such I/O interface 808. The touch screen can be activated with a stylus or a finger.

The I/O interface 808 can include one or more devices for presenting output to a user, including, but not limited to, a graphics engine, a display (e.g., a display screen), one or more output providers (e.g., display providers), one or more audio speakers, and one or more audio providers. In certain embodiments, interface 808 is configured to provide graphical data to a display for presentation to a user. The graphical data can be representative of one or more graphical user interfaces and/or any other graphical content as can serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 can include a network interface controller ("NIC") or network adapter for communicating with an Ethernet or other wire-based network or a wireless NIC ("WNIC") or wireless adapter for communicating with a wireless network, such as a WI-FI. The computing device 800 can further include a bus 812. The bus 812 can comprise hardware, software, or both that couples components of computing device 800 to each other.

Figure 9:
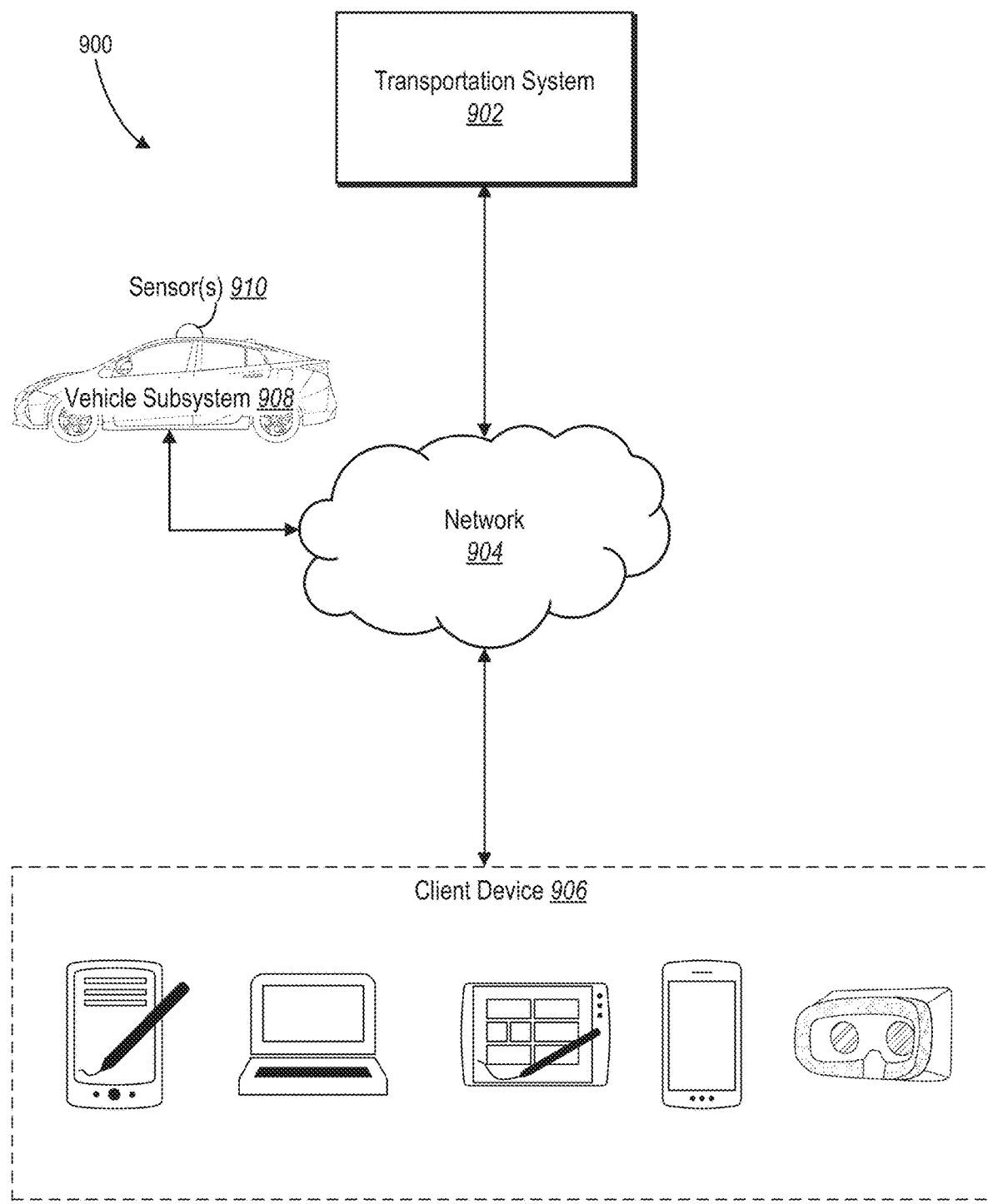
FIG. 9 illustrates an example environment for a transportation system in accordance with one or more embodiments.

FIG. 9 illustrates an example network environment 900 of a dynamic transportation system. The network environment 900 includes a client device 906, a transportation system 902, and a vehicle subsystem 908 connected to each other by a network 904. Although FIG. 9 illustrates a particular arrangement of the client device 906, dynamic transportation system 902, vehicle subsystem 908, and network 904, this disclosure contemplates any suitable arrangement of client device 906, dynamic transportation system 902, vehicle subsystem 908, and network 904. As an example, and not by way of limitation, two or more of client device 906, dynamic transportation system 902, and vehicle subsystem 908 communicate directly, bypassing network 904. As another example, two or more of client device 906, dynamic transportation system 902, and vehicle subsystem 908 can be physically or logically co-located with each other in whole or in part. Moreover, although FIG. 9 illustrates a particular number of client devices 906, dynamic transportation systems 902, vehicle subsystems 908, and networks 904, this disclosure contemplates any suitable number of client devices 906, dynamic transportation systems 902, vehicle subsystems 908, and networks 904. As an example, and not by way of limitation, network environment 900 can include multiple client device 906, dynamic transportation systems 902, vehicle subsystems 908, and networks 904.

This disclosure contemplates any suitable network 904. As an example, and not by way of limitation, one or more portions of network 904 can include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 can include one or more networks 904.

Links can connect client device 906, dynamic transportation system 902, and vehicle subsystem 908 to network 904 or to each other. This disclosure contemplates any suitable links. For instance embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. For instance embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links can differ in one or more respects from one or more second links.

For instance embodiments, client device 906 can be an electronic device including hardware, software, or embedded logic components or a combination of two or more such components and capable of carrying out the appropriate functionalities implemented or supported by client device 906. As an example, and not by way of limitation, a client device 906 can include any of the computing devices discussed above in relation to FIG. 8. A client device 906 can enable a network user at client device 906 to access network 904. A client device 906 can enable its user to communicate with other users at other client devices 906.

For instance embodiments, client device 906 can include a requestor application or a web browser, such as MICROSOFT INTERNET EXPLORER, GOOGLE CHROME or MOZILLA FIREFOX, and can have one or more add-ons, plug-ins, or other extensions, such as TOOLBAR or YAHOO TOOLBAR. A user at client device 906 can enter a Uniform Resource Locator ("URL") or other address directing the web browser to a particular server (such as server), and the web browser can generate a Hyper Text Transfer Protocol ("HTTP") request and communicate the HTTP request to server. The server can accept the HTTP request and communicate to client device 906 one or more Hyper Text Markup Language ("HTML") files responsive to the HTTP request. Client device 906 can render a webpage based on the HTML files from the server for presentation to the user. This disclosure contemplates any suitable webpage files. As an example, and not by way of limitation, webpages can render from HTML files, Extensible Hyper Text Markup Language ("XHTML") files, or Extensible Markup Language ("XML") files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

For instance embodiments, dynamic transportation system 902 can be a network-addressable computing system that can host a transportation matching network. Dynamic transportation system 902 can generate, store, receive, and send data, such as, for example, user-profile data, concept-profile data, text data, transportation request data, GPS location data, provider data, requestor data, vehicle data, or other suitable data related to the transportation matching network. This can include authenticating the identity of providers and/or vehicles who are authorized to provide transportation services through the dynamic transportation system 902. In addition, the dynamic transportation system can manage identities of service requestors such as users/requestors. For instance, the dynamic transportation system can maintain requestor data such as driving/riding histories, personal data, or other user data in addition to navigation and/or traffic management services or other location services (e.g., GPS services).

For instance embodiments, the dynamic transportation system 902 can manage transportation matching services to connect a user/requestor with a vehicle and/or provider. By managing the transportation matching services, the dynamic transportation system 902 can manage the distribution and allocation of resources from the vehicle subsystems 908 and user resources such as GPS location and availability indicators, as described herein.

Dynamic transportation system 902 can be accessed by the other components of network environment 900 either directly or via network 904. For instance embodiments, dynamic transportation system 902 can include one or more servers. Each server can be a unitary server or a distributed server spanning multiple computers or multiple datacenters. Servers can be of various types, such as, for example and without limitation, web server, news server, mail server, message server, advertising server, file server, application server, exchange server, database server, proxy server, another server suitable for performing functions or processes described herein, or any combination thereof. For instance embodiments, each server can include hardware, software, or embedded logic components or a combination of two or more such components for carrying out the appropriate functionalities implemented or supported by server. For instance embodiments, dynamic transportation system 802 can include one or more data stores. Data stores can be used to store various types of information. For instance embodiments, the information stored in data stores can be organized according to specific data structures. For instance embodiments, each data store can be a relational, columnar, correlation, or other suitable database. Although this disclosure describes or illustrates particular types of databases, this disclosure contemplates any suitable types of databases. Particular embodiments can provide interfaces that enable a client device 906, or a dynamic transportation system 902 to manage, retrieve, modify, add, or delete, the information stored in data store.

For instance embodiments, dynamic transportation system 902 can provide users with the ability to take actions on various types of items or objects, supported by dynamic transportation system 902. As an example, and not by way of limitation, the items and objects can include transportation matching networks to which users of dynamic transportation system 902 can belong, vehicles that users can request, location designators, computer-based applications that a user can use, transactions that allow users to buy or sell items via the service, interactions with advertisements that a user can perform, or other suitable items or objects. A user can interact with anything that is capable of being represented in dynamic transportation system 902 or by an external system of a third-party system, which is separate from dynamic transportation system 902 and coupled to dynamic transportation system 902 via a network 904.

For instance embodiments, dynamic transportation system 902 can be capable of linking a variety of entities. As an example, and not by way of limitation, dynamic transportation system 902 can enable users to interact with each other or other entities, or to allow users to interact with these entities through an application programming interfaces ("API") or other communication channels.

For instance embodiments, dynamic transportation system 902 can include a variety of servers, sub-systems, programs, modules, logs, and data stores. For instance embodiments, dynamic transportation system 902 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Dynamic transportation system 902 can also include suitable components such as network interfaces, security mechanisms, load balancers, failover servers, management-and-network-operations consoles, other suitable components, or any suitable combination thereof. For instance embodiments, dynamic transportation system 902 can include one or more user-profile stores for storing user profiles. A user profile can include, for example, biographic information, demographic information, behavioral information, social information, or other types of descriptive information, such as work experience, educational history, hobbies or preferences, interests, affinities, or location.

The web server can include a mail server or other messaging functionality for receiving and routing messages between dynamic transportation system 902 and one or more client devices 906. An action logger can be used to receive communications from a web server about a user's actions on or off dynamic transportation system 902. In conjunction with the action log, a third-party-content-object log can be maintained of user exposures to third-party-content objects. A notification controller can provide information regarding content objects to a client device 906. Information can be pushed to a client device 806 as notifications, or information can be pulled from client device 906 responsive to a request received from client device 906. Authorization servers can be used to enforce one or more privacy settings of the users of dynamic transportation system 902. A privacy setting of a user determines how particular information associated with a user can be shared. The authorization server can allow users to opt in to or opt out of having their actions logged by dynamic transportation system 902 or shared with other systems, such as, for example, by setting appropriate privacy settings. Third-party-content-object stores can be used to store content objects received from third parties. Location stores can be used for storing location information received from client devices 906 associated with users.

In addition, the vehicle subsystem 908 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 908 can include an autonomous vehicle—i.e., a vehicle that does not require a human operator. In these embodiments, the vehicle subsystem 908 can perform maneuvers, communicate, and otherwise function without the aid of a human provider, in accordance with available technology.

For instance embodiments, the vehicle subsystem 908 can include one or more sensors incorporated therein or associated thereto. For example, sensor(s) can be mounted on the top of the vehicle subsystem 908 or else can be located within the interior of the vehicle subsystem 908. In certain embodiments, the sensor(s) can be located in multiple areas at once—i.e., split up throughout the vehicle subsystem 908 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

For instance embodiments, the vehicle subsystem 908 can include a communication device capable of communicating with the client device 906 and/or the transportation system 902. For example, the vehicle subsystem 908 can include an on-board computing device communicatively linked to the network 904 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention can be embodied in other specific forms without departing from its spirit or essential characteristics. The described embodiments are to be considered in all respects only as illustrative and not restrictive. For example, the methods described herein can be performed with less or more steps/acts or the steps/acts can be performed in differing orders. Additionally, the steps/acts described herein can be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention can be embodied in other specific forms without departing from its spirit or essential characteristics. The described embodiments are to be considered in all respects only as illustrative and not restrictive. For example, the methods described herein can be performed with less or more steps/acts or the steps/acts can be performed in differing orders. Additionally, the steps/acts described herein can be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

The invention claimed is:

1. A method comprising:
providing, for display at a provider computing device, a graphical user interface comprising an information portion in a collapsed state, the information portion comprising information relevant to a ride request;
expanding the information portion from the collapsed state to an expanded state based on determining that a physical location associated with the provider computing device corresponds to a pickup location area associated with the ride request; and
providing, for display within the expanded information portion, a timer element indicating a time period for a requestor associated with the ride request to arrive at the pickup location.

2. The method as recited in claim 1, further comprising:
determining that the requestor has not arrived at the pickup location at an expiration of the time period; and
providing, for display at the provider computing device, a cancellation element.

3. The method as recited in claim 1, further comprising:
providing, within the expanded information portion, an inactive interactive contact element;
determining that an initial amount of time after the determination that the physical location of the provider computing device corresponds with the pickup location has expired; and
based on determining that the initial amount of time has expired, activating the interactive contact element.

4. The method as recited in claim 3, further comprising:
detecting a contact attempt based on determining a provider associated with the provider computing device selected the interactive contact element; and
based on detecting the contact attempt, providing a selectable cancellation element within the information portion in the expanded state.

5. The method as recited in claim 1, wherein the information portion in the collapsed state comprises a discrete subset of the information relevant to the ride request.

6. The method as recited in claim 5, wherein the discrete subset of the information comprises a requestor avatar element, an estimated time of arrival, and a requestor name element.

7. The method as recited in claim 1, further comprising:
detecting a trigger event associated with the ride request; and based on detecting the trigger event, collapsing the expanded information portion.

8. The method as recited in claim 7, further comprising:
providing a pickup element for display within the expanded portion; and
wherein detecting the trigger event comprises detecting a selection of the pickup element.

9. A non-transitory computer readable storage medium comprising instructions that, when executed by at least one processor, cause a computing device to:
provide, for display at a provider computing device, a graphical user interface comprising an information portion in a collapsed state, the information portion comprising information relevant to a ride request;
expand the information portion from the collapsed state to an expanded state based on determining that a physical location associated with the provider computing device corresponds to a pickup location area associated with the ride request; and
provide, for display within the expanded information portion, a timer element indicating a time period for a requestor associated with the ride request to arrive at the pickup location.

10. The non-transitory computer readable storage medium of claim 9, further comprising instructions that, when executed by the at least one processor, cause the computing device to:
determine that the requestor has not arrived at the pickup location at an expiration of the time period; and
provide, for display at the provider computing device, a cancellation element.

11. The non-transitory computer readable storage medium of claim 9, further comprising instructions that, when executed by the at least one processor, cause the computing device to:
provide, within the expanded information portion, an inactive interactive contact element;
determine that an initial amount of time after the determination that the physical location of the provider computing device corresponds with the pickup location has expired; and
based on determining that the initial amount of time has expired, activate the interactive contact element.

12. The non-transitory computer readable storage medium of claim 11, further comprising instructions that, when executed by the at least one processor, cause the computing device to:
detect a contact attempt based on determining a provider associated with the provider computing device selected the interactive contact element; and
based on detecting the contact attempt, provide a selectable cancellation element within the information portion in the expanded state.

13. The non-transitory computer readable storage medium of claim 9, further comprising instructions that, when executed by the at least one processor, cause the computing device to:
detect a trigger event associated with the ride request; and
based on detecting the trigger event, collapse the expanded information portion.

14. The non-transitory computer readable storage medium of claim 13, further comprising instructions that, when executed by the at least one processor, cause the computing device to:
provide a pickup element for display within the expanded portion; and
wherein detecting the trigger event comprises detecting a selection of the pickup element.

15. A system comprising:
at least one processor; and
at least one non-transitory computer readable storage medium storing instructions thereon that, when executed by the at least one processor, cause the system to:
provide, for display at a provider computing device, a graphical user interface comprising an information portion in a collapsed state, the information portion comprising information relevant to a ride request;
expand the information portion from the collapsed state to an expanded state based on determining that a physical location associated with the provider computing device corresponds to a pickup location area associated with the ride request; and
provide, for display within the expanded information portion, a timer element indicating a time period for a requestor associated with the ride request to arrive at the pickup location.

16. The system of claim 15, wherein the information portion in the collapsed state comprises a discrete subset of the information relevant to the ride request.

17. The system of claim 16, wherein the discrete subset of the information comprises a requestor avatar element, an estimated time of arrival, and a requestor name element.

18. The system of claim 15, further comprising instructions that, when executed by the at least one processor, cause the system to:
detect a trigger event associated with the ride request; and
based on detecting the trigger event, collapse the expanded information portion.

19. The system of claim 18, further comprising instructions that, when executed by the at least one processor, cause the system to:
provide a pickup element for display within the expanded portion; and
wherein detecting the trigger event comprises detecting a selection of the pickup element.

20. The system of claim 15, further comprising instructions that, when executed by the at least one processor, cause the system to:
determine that the requestor has not arrived at the pickup location at an expiration of the time period; and
provide, for display at the provider computing device, a cancellation element.

* * * * *